United States Patent
Klein et al.

(10) Patent No.: US 12,142,020 B2
(45) Date of Patent: Nov. 12, 2024

(54) SYSTEMS AND METHODS FOR ESTIMATING VISIBILITY IN A SCENE

(71) Applicant: Areté Associates, Northridge, CA (US)

(72) Inventors: Timothy M. Klein, Huntsville, AL (US); Peter J. Rusello, Arlington, VA (US); Benjamin E. K. Sugerman, Baltimore, MD (US); Amanda M. Steck, Huntsville, AL (US)

(73) Assignee: Arete Associates, Northridge, CA (US)

( * ) Notice: Subject to any disclaimer, the term of this patent is extended or adjusted under 35 U.S.C. 154(b) by 319 days.

(21) Appl. No.: 17/728,906

(22) Filed: Apr. 25, 2022

(65) Prior Publication Data

US 2022/0392188 A1    Dec. 8, 2022

Related U.S. Application Data

(60) Provisional application No. 63/180,249, filed on Apr. 27, 2021.

(51) Int. Cl.
*G06V 10/26*      (2022.01)
*G06T 5/50*      (2006.01)
(Continued)

(52) U.S. Cl.
CPC ............. *G06V 10/26* (2022.01); *G06T 5/50* (2013.01); *G06T 5/92* (2024.01); *G06V 10/806* (2022.01);
(Continued)

(58) Field of Classification Search
CPC ...... G06V 10/26; G06V 10/806; G06V 10/82; G06V 20/52; G06T 5/50; G06T 5/92; G06T 2207/10048; H04N 23/11
See application file for complete search history.

(56) References Cited

U.S. PATENT DOCUMENTS

| 6,067,110 A | * | 5/2000 | Nonaka | H04N 7/18 |
| | | | | 348/148 |
| 2002/0096622 A1 | * | 7/2002 | Adler-Golden | G06T 5/50 |
| | | | | 250/208.1 |

(Continued)

FOREIGN PATENT DOCUMENTS

CN      109214470      1/2019

OTHER PUBLICATIONS

International Search Report from Application No. PCT/US2022/026222 dated Jul. 14, 2022.

*Primary Examiner* — Jitesh Patel
(74) *Attorney, Agent, or Firm* — FisherBroyles, LLP; Gregory T. Fettig

(57) ABSTRACT

Systems and methods herein provide for improving visibility in a scene. In one embodiment, a system includes a first camera device operable to capture images of a scene at a first band of wavelengths, and a second camera device operable to capture images of the scene at a second band of wavelengths. The first and second bands are different. The system also includes a processor communicatively coupled to the first and second camera devices, the processor being operable to detect an object in the scene based on a first of the images from the first camera device and based on a first of the images from the second camera device that was captured at substantially a same time as the first image from the first camera device, to estimate an obscurant in the scene based on the first images, and to estimate a visibility parameter of the scene based on the object and the estimated obscurant.

16 Claims, 25 Drawing Sheets

(51) Int. Cl.
*G06T 5/92* (2024.01)
*G06V 10/80* (2022.01)
*G06V 10/82* (2022.01)

(52) U.S. Cl.
CPC .... *G06V 10/82* (2022.01); *G06T 2207/10048* (2013.01)

(56) References Cited

U.S. PATENT DOCUMENTS

| | | |
|---|---|---|
| 2005/0270784 A1 | 8/2005 | Hahn |
| 2010/0013965 A1* | 1/2010 | Pugh, Jr. ............... G06V 10/255 348/254 |
| 2011/0025529 A1* | 2/2011 | Uechi .............. G08G 1/096783 340/905 |
| 2011/0043603 A1* | 2/2011 | Schechner ................ G06T 5/73 348/E5.062 |
| 2012/0183175 A1 | 7/2012 | Alouini |
| 2012/0250947 A1 | 10/2012 | Abramovich |
| 2014/0140620 A1 | 5/2014 | Jiyun |
| 2015/0317535 A1 | 11/2015 | Lenor |
| 2016/0200254 A1* | 7/2016 | Raab .................... H04N 23/698 348/148 |
| 2016/0321510 A1 | 11/2016 | Abhau |
| 2016/0321790 A1 | 11/2016 | Wang |
| 2020/0151265 A1* | 5/2020 | Gupta ................... G06Q 10/02 |
| 2020/0311887 A1 | 10/2020 | Kar |
| 2022/0044441 A1* | 2/2022 | Kalra .................. G06V 10/454 |

* cited by examiner

SYSTEMS AND METHODS FOR ESTIMATING VISIBILITY IN A SCENE

CROSS REFERENCE TO RELATED APPLICATIONS

This patent application claims priority to, and thus the benefit of an earlier filing date from, U.S. Provisional Patent Application No. 63/180,249 (filed Apr. 27, 2021), the contents of which are hereby incorporated by reference.

GOVERNMENT LICENSE RIGHTS

This invention was made with government support under SBIR contract No. 1305M219CNRMW0027 awarded by NOAA (NOAA 2018-1 Subtopic 8.2.6). The government has certain rights in the invention.

BACKGROUND

Meteorological visibility and meteorological optical ranging (MOR) are important operational and safety parameters in maritime operations, aviation operations, and various other transit operations. For example, low visibility can create unsafe conditions that increase transit times, slow operations, and lead to accidents with significant monetary and environmental costs, including the loss of life. Reliable visibility measurements can reduce the hazards associated with conducting transit operations in these conditions.

Visibility estimation methods can generally be divided into three categories-human observation, active laser scattering, and image processing methods. Human observation methods rely on a trained person to estimate visibility based on a set of predetermined criteria. There are, of course, several drawbacks to this approach. For example, the time and training required to supply people for the task is expensive. And, the task is particularly challenging to personnel in harsh environmental conditions and/or over long continuous periods. This approach also generally requires the deployment and maintenance of calibrated targets within a scene that still result in observations and judgements that are subjective even with well-trained individuals.

Another approach regards active scattering where a laser source may be used to illuminate a controlled volume. Detectors measure scattered light returns and calculate visibility. For example, a volume of distributed scatterers with known visibility characteristics may be used to calibrate a laser based measurement system. Once calibrated to the volume of scatterers, the system may then be employed to measure other volumes of distributed scatterers in the environment. While these approaches can be effective, the components are expensive and generally only make localized measurements that may not be representative of a larger region of interest due to non-homogenous conditions, such as patchy fog, blowing wind, etc. And, heaters may also be required to avoid icing of the system in cold environments.

Other image processing methods rely on predetermined/fixed scenes or targets. These methods can be effective but are generally difficult and expensive to deploy. And, the systems employed to implement these methods also typically have a lesser range of visibility that can be measured, limiting their roles in certain weather conditions. And, some systems rely only on visible light, which have limited applicability at night.

Other visibility measurement systems use transmissive based optical techniques and/or scattering-based optical techniques to make local measurements at sensor locations. These systems then extrapolate the measurements to a wider area around the sensor. However, "patchy", localized, and/or otherwise heterogeneous obscurants can cause errors during extrapolation. These techniques are also fairly expensive in terms of maintenance and initial installation, and generally require more power.

SUMMARY

Systems and methods herein provide for improving visibility in a scene. In one embodiment, a system includes a first camera device operable to capture images of a scene at a first band of wavelengths, and a second camera device operable to capture images of the scene at a second band of wavelengths. The first and second bands are different. The system also includes a processor communicatively coupled to the first and second camera devices, the processor being operable to detect an object in the scene based on a first of the images from the first camera device and based on a first of the images from the second camera device that was captured at substantially a same time as the first image from the first camera device, to estimate an obscurant in the scene based on the first images, and to estimate a visibility parameter of the scene based on the object and the estimated obscurant.

The embodiments herein provide for a more elegant manner of measuring visibility to aid weather forecasters and to assist in operational decisions for transportation and/or other environments that require high visibility. The embodiments herein may be particularly advantageous in marine and coastal environments.

Additionally, the various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody certain principles and are included within the scope of the embodiments. Furthermore, any examples described herein are intended to aid in understanding the embodiments and are to be construed as being without limitation to such specifically recited examples and conditions. As a result, the embodiments are not limited to any of the examples described below.

Figure 1A:
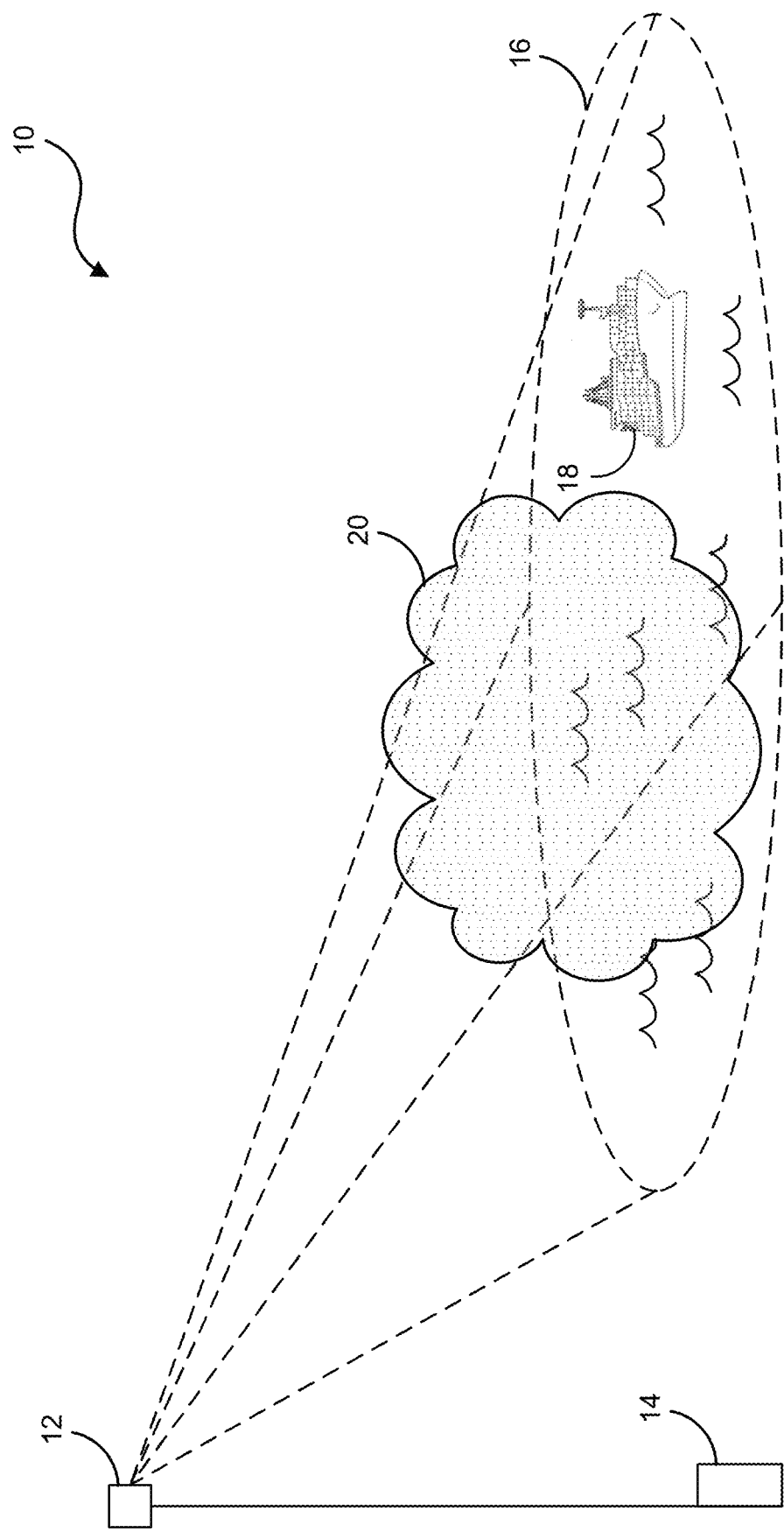
FIGS. 1A and B are block diagrams of an exemplary system for estimating visibility in a scene.
Figure 2:
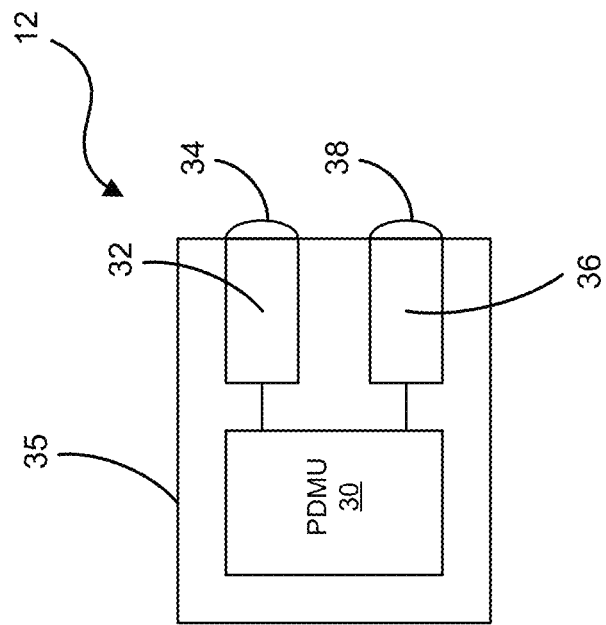
FIG. 2 is a block diagram of an exemplary camera module.

FIG. 1A is a block diagram of a system 10 for estimating visibility in a scene, in one exemplary embodiment. In this embodiment, the system 10 includes a camera module 12 that is operable to house two or more camera devices 32 and 36, as illustrated in FIG. 2. The camera devices 32 and 36 are operable to capture images of a scene 16 at different bands of wavelengths. For example, the camera device 32 may be operable to capture images in the visible light band of wavelengths. In some embodiments, the camera device 32 may be a polarized electro-optical camera capable of capturing polarization information that is undetectable by common consumer cameras. For example, the camera device 32 may be operable to capture a four directional polarization image in one snapshot using a four directional polarizer. The camera device 36, in this embodiment, may be implemented as a long wave infrared (LWIR) camera capable of capturing images in a band of wavelengths from roughly 8,000 nm to 12,000 nm.

A processing module 14 may be communicatively coupled to the camera devices 32 and 36 in the camera module 12. The processing module 14 may include a processor, a communication interface, a storage element (e.g., a solid state storage device, a hard disk drive, etc.), computer memory, input/output (I/O) modules, etc. for use in processing the images captured by the camera devices 32 and 36. One example of a system that may be used to implement the processing module 14 is shown and described with the computing system 200 of FIG. 17. In this regard, the processing module 14 may be operable to detect an object 18 (e.g., a boat, a ship, a vehicle, a tree, debris, etc.) in the scene 16 based on at least one image from the camera device 32 and at least one image from the camera device 36. The processing module 14 may direct the camera devices 32 and 36 to capture these images at substantially the same time. Alternatively or additionally, the camera devices 32 and 36 may be configured to continually capture images of the scene 16, and the processing module 14 may select images with similar timestamps for processing to estimate the visibility of the scene 16.

The processing module 14, after detecting the object 18 may be operable to detect and remove or at least diminish an obscurant 20 from the scene 16 based on the images from the camera devices 32 and 36. That is, the processing module 14 may be operable to digitally remove the obscuring properties of the obscurant 20 from one or more of the images to digitally reveal the object 18 in the scene 16. Alternatively or additionally, the processing module 14 may estimate a visibility parameter of the scene 16. Some examples of the obscurant 20, in this embodiment, may include volumetric scatterers (e.g., aerosols, fog, dust, pollution, smog, etc.) that randomly and/or pseudo-randomly scatter light in various directions.

Figure 1B:
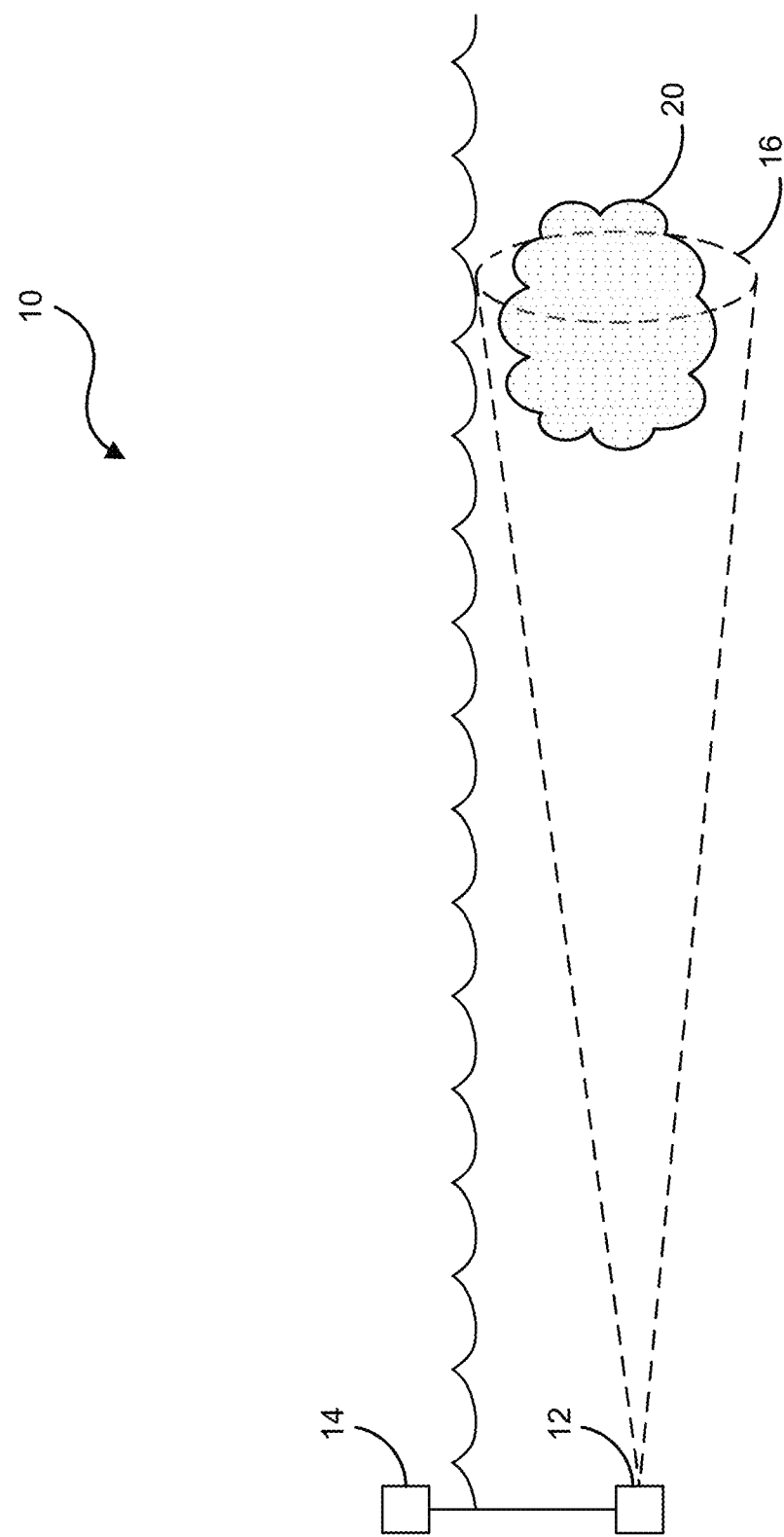

FIG. 1B is another block diagram of the system 10. In this embodiment, the camera module 12 is submerged under water such that the camera devices 32 and 36 can capture images of an obscurant 20 in the scene 16 to estimate visibility in the water. For example, volumetric scatterers (e.g., pollution, bio matter, bubbles, salinity, etc.) can cause visibility to change from one body of water to another (or even within regions of one body of water). The system 10 is operable to estimate the visibility parameter of the scene 16 by capturing images of the obscurant 20 in the scene 16 and processing those images as described in FIG. 1B.

The system 10 may be established in any environment where visibility is highly desirable (e.g., for air traffic, roads, sea traffic etc.). In this regard, the processing module 14 may convey the visibility estimate to personnel requiring such information.

FIG. 2 is a block diagram of an exemplary camera module 12 of the system 10. In this embodiment, the camera module 12 includes a camera housing 35 with the camera devices 32 and 36 and a power and data management unit (PDMU) 30 configured therein. The PDMU 30 may be operable to provide power to the camera devices 32 and 36 and communicate images from the camera devices 32 and 36 to the processing module 14. In some embodiments, the camera module may receive control signals from the processing module 14 to control the cameras 32 and 36. In some embodiments, the camera housing 35 is hermetically sealed so as to protect the PDMU 30 and the camera devices 32 and 36 from the environment in which the camera module 35 is established. In this regard, the camera housing 12 may be configured with protective lenses 34 and 38 that allow the camera devices 32 and 36 to capture images of the scene 16 while protecting the camera devices 32 and 36 from the environment.

As mentioned, the camera device 32 may be a polarized electro-optical camera. In such an embodiment, the camera device 32 may be capable of producing full Stokes polarization. One example of such an electro-optical camera includes the Phoenix IMX250MZR manufactured by Sony Corporation. And, the camera device 36 may be an infrared camera, such as a microbolometer that is sensitive to long-wave infrared light. One example of such an infrared camera includes the Dalsa Calibir 640 manufactured by Teledyne Technologies. It should be noted that the camera module 12 may be configured with additional camera devices that capture images at the same or different bands of wavelengths of the camera devices 32 and 36, as such, wavelength/polarization sensitivity may be selected with these additional cameras as a matter of design choice.

Figure 3:
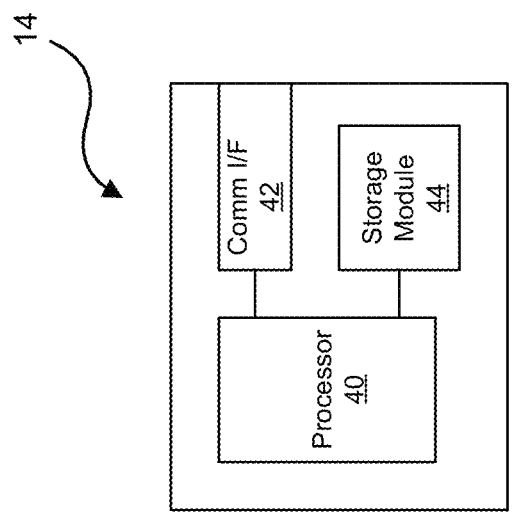
FIG. 3 is a block diagram of an exemplary power and data management unit.

FIG. 3 is a block diagram of an exemplary processing module 14. In this embodiment, the processing module 14 is configured with a communication interface 42, a storage module 44 (i.e., for persistent and/or volatile data storage), and a computer processor 40. In some embodiments, the storage module 44 may include computer instructions that direct the processor 40 to process the images captured by the camera devices 32 and 36 and generate a visibility estimate of the scene 16 as described above. The processing module 14 may be configured as a unit that is separate from the camera module 12. However, the processing module 14 may be incorporated with the camera module 12 to provide a compact processing system design that may be quickly established in a variety of environments. In other embodiments, the processor 40 may be configured to simply route imaged data of the camera devices 32 and 36 to the communication interface 42 for remote processing outside of the environment in which the camera module 12 is established.

Figure 4:
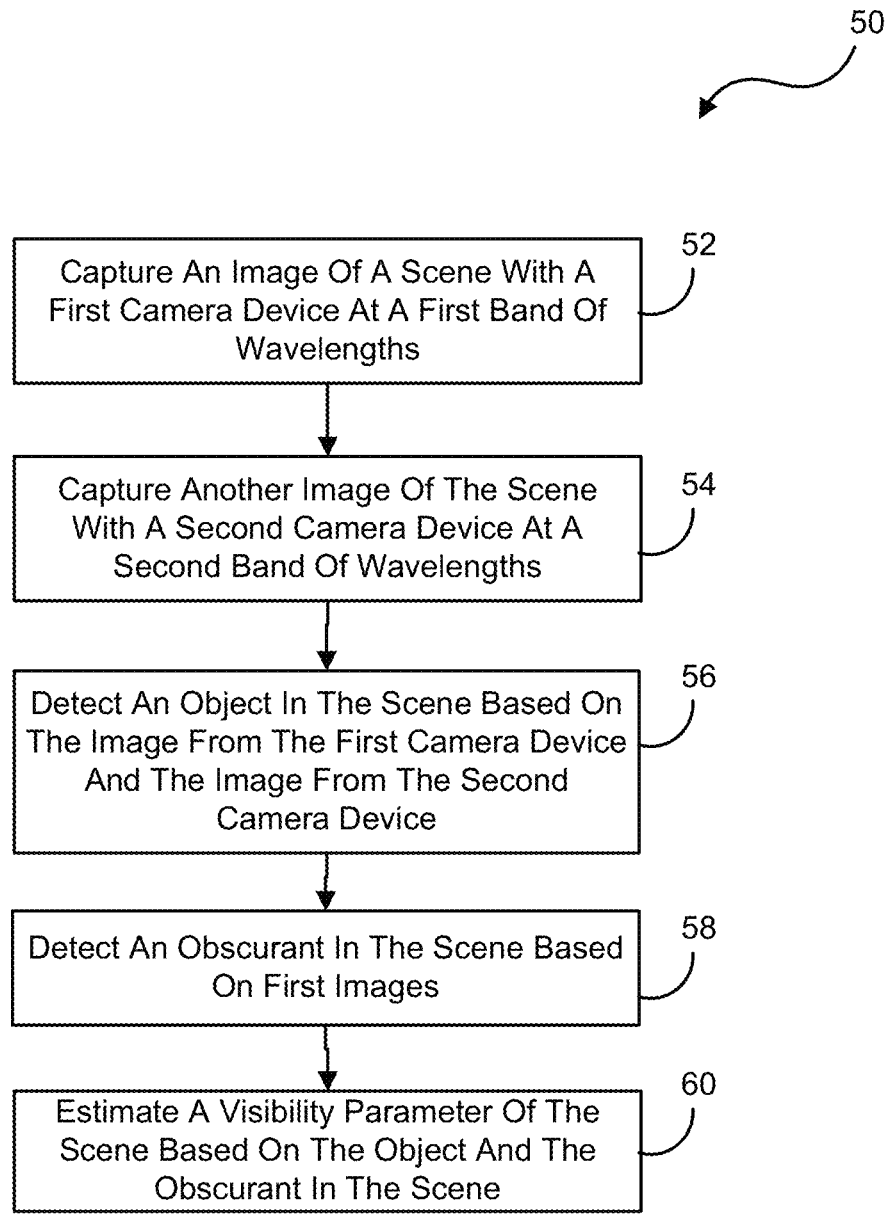
FIG. 4 is a flowchart of an exemplary process of the system of FIG. 1.

FIG. 4 is a flowchart of an exemplary process 50 operable with the system 10. In this embodiment, a first image of the scene 16 is captured with a first camera device (e.g., the camera device 32) at a first band of wavelengths, in the process element 52. And, at or about the same time, another image of the scene 16 is captured with a second camera device (e.g., the camera device 36) at a second band of wavelengths that differs from the first band of wavelengths of the first camera device, in the process element 54. Then, the processing module 14 may detect an object 18 in the scene 16 based on the images from the first camera device and the second camera device, in the process element 56. This process may be part of a principal component analysis (PCA) and coherent noise estimation process in which the processor 40 may operate on red-green-blue (RGB) image data, longwave infrared image data, and/or polarization image data to detect the object 18. Coherent noise removal is an effective method that estimates and removes coherent noise present in the data within the Fourier domain, details of which are shown and described below.

The processing module 14 may also detect the obscurant 20 from the scene 16 based on the images from the first and second camera devices, in the process element 58. In some embodiments, this process may involve estimating coherent noise in the images and operating on individual pixels within the images to remove the coherent noise from the images, details of which are also shown and described below.

Then, with these features detected (i.e., via the process elements 56 and 58), the processing module 14 may estimate a visibility parameter of the scene 16 based on the object 18 and the obscurant 20 in the scene 16, in the process element 60.

Figure 5:
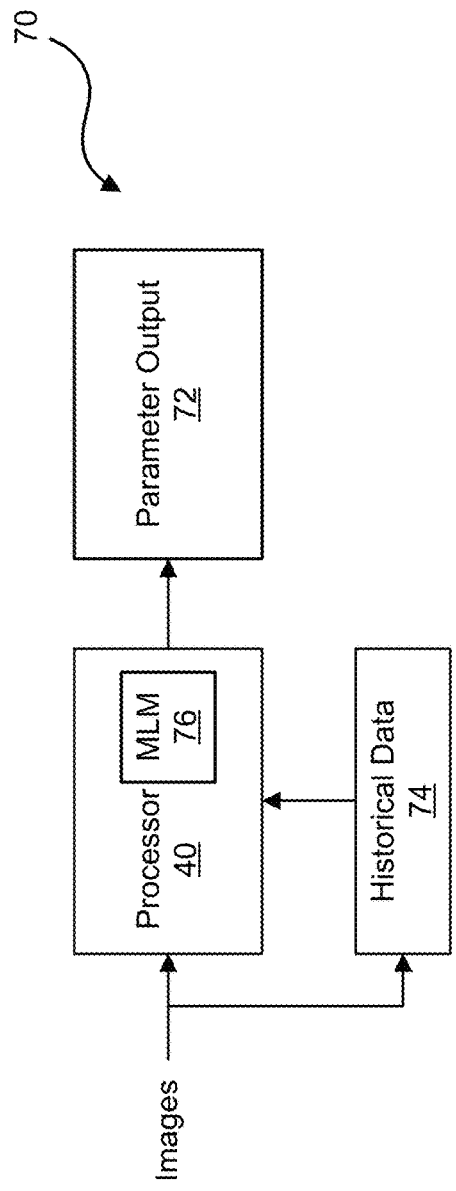
FIG. 5 is a block diagram of an exemplary processing technique of the system of FIG. 1.
Figure 6:
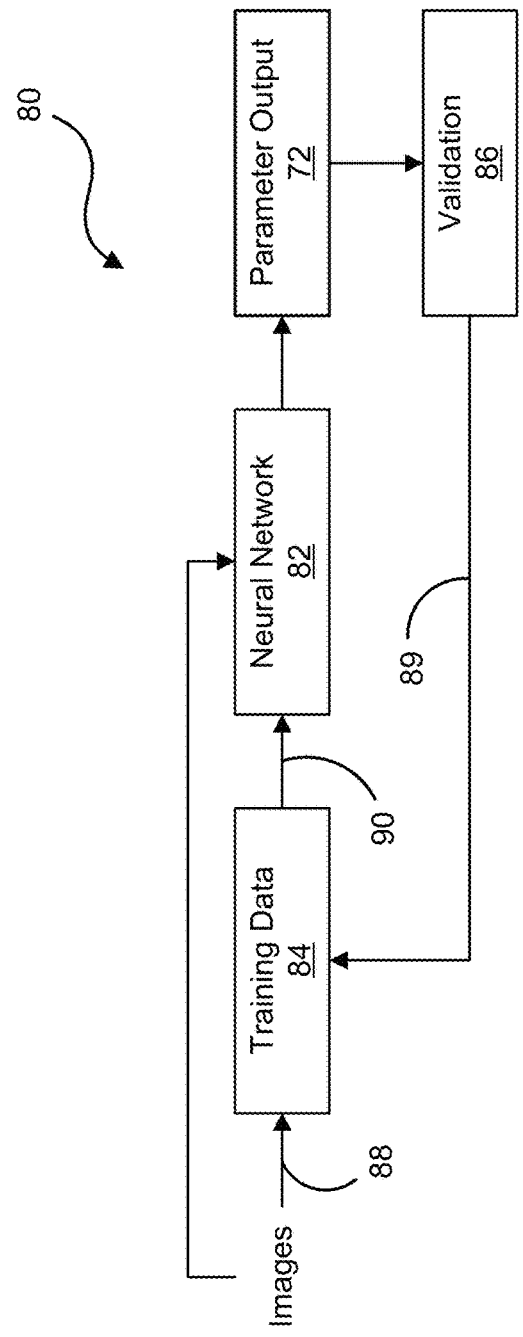
FIG. 6 is a block diagram of another exemplary processing technique of the system of FIG. 1.

FIGS. 5 and 6 illustrate two high-level embodiments of the processing module 14 in which the visibility parameter of the scene 16 may be obtained. More specifically, FIG. 5 illustrates a machine learning process 70 in which historical data 34 is used to train a machine learning module 76 implemented by the processor 40, in one exemplary embodiment. FIG. 6 illustrates an alternative or additional machine learning process 80 that employs a neural network 82, in one exemplary embodiment.

Machine learning generally regards algorithms and statistical models that computer systems use to perform a specific task without using explicit instructions, relying on patterns and inference instead. For example, machine learning algorithms may build a mathematical model based on sample data, known as "training data", in order to make predictions or decisions without being explicitly programmed to perform the task. Thus, when a plurality of images is obtained from the scene 16 with each image having an associated visibility parameter, the images and their visibility parameters may be used to train a machine learning module. Typically, many images are used (e.g., hundreds, thousands, or more) because a larger number of datasets provides a better statistical model to predict features in another image. Then, once the machine learning module 76 is trained with these images, another image may be processed through the machine learning module 76 to estimate the visibility parameter of that image.

Some nonlimiting examples of machine learning algorithms that may be implemented by the machine learning module 76 include a supervised learning algorithm, a semi-supervised learning algorithm, an unsupervised learning algorithm, a regression analysis algorithm, a reinforcement learning algorithm, a self-learning algorithm, a feature learning algorithm, a sparse dictionary learning algorithm, an anomaly detection algorithm, a generative adversarial network algorithm, a transfer learning algorithm, and an association rules algorithm.

In the FIG. 5 embodiment, the processor 40 of the processing module 14 receives images from the camera devices 32 and 36. From there, the processor 40 processes the images through a machine learning module 76 that has been trained with historical data 74. The historical data 74 may comprise a plurality of images of the scene 16 (e.g., 1000 or more) previously captured by the camera devices 32 and 36. And, the images from the camera devices 32 and 36 may be arranged in image sets according to times of capture. For example, the camera device 32 may capture an image of the scene 16 at a particular time. And, the camera device 36 may capture an image at or about the same time. These two images from the camera devices 32 and 36 may be combined into an image set that is retained in a storage device (e.g., a database, the storage module 44 of FIG. 2, a cloud computing data storage, etc.) and used for the historical data 74. Each image set may be analyzed in accordance with the embodiments herein to estimate a visibility parameter. Alternatively or additionally, the visibility parameter of each image set may be estimated according to previously known techniques for estimating the visibility parameter. In any case, the visibility parameter is assigned to the image set and then used as training data (i.e., the historical data 74) to train the machine learning module 76 implemented by the processor 40.

Once the machine learning module 76 is trained, a new image set from the camera devices 32 and 36 may be processed through the machine learning module 76 of the processor 40 to estimate a visibility parameter for that image set. The visibility parameter is then output as the parameter output 72. And, with the visibility parameter for that image set being estimated, the visibility parameter may be assigned to that image set and added to the historical data 74 for subsequent training of the machine learning module 76.

In the FIG. 6 embodiment, the images from the camera devices 32 and 36 are input to a neural network 82 of the machine learning process 80. Some examples of the neural network 82 include convolutional neural networks (CNNs), feed-forward neural networks, radial basis function (RBF) neural networks, multilayer perceptrons, recurrent neural networks, and modular neural networks. The images from the camera devices 32 and 36 may be configured as an image set similar to that discussed with the historical data 74 of FIG. 5, which may be used as training data 84 to train the neural network 82. For example, in episodic training of the neural network 82, new data and validated estimates may be accumulated along paths 88 and 89 and, at periodic but relatively infrequent intervals, the network may be retrained over path 90. In continuous training, new data and estimates may be passed along paths 88 and 89, and the neural network 82 may be retrained over path 90 at each measurement period. In any case, the neural network 82 may operate on the image set to estimate the visibility parameter of the images from the camera devices 32 and 36, which may be output as the parameter output 72.

In this embodiment, the parameter output 72 is validated with a validation module 86. For example, the validation module 86 may compare the visibility estimate from the images obtained by the camera devices 32 and 36 to historical images from the camera devices 32 and/or 36 that have already had their visibilities estimated and validated. If the visibility estimates are substantially similar, the validation module 86 may validate the estimate as true and input the images into the training data 84 along with the visibility estimate.

Figure 7:
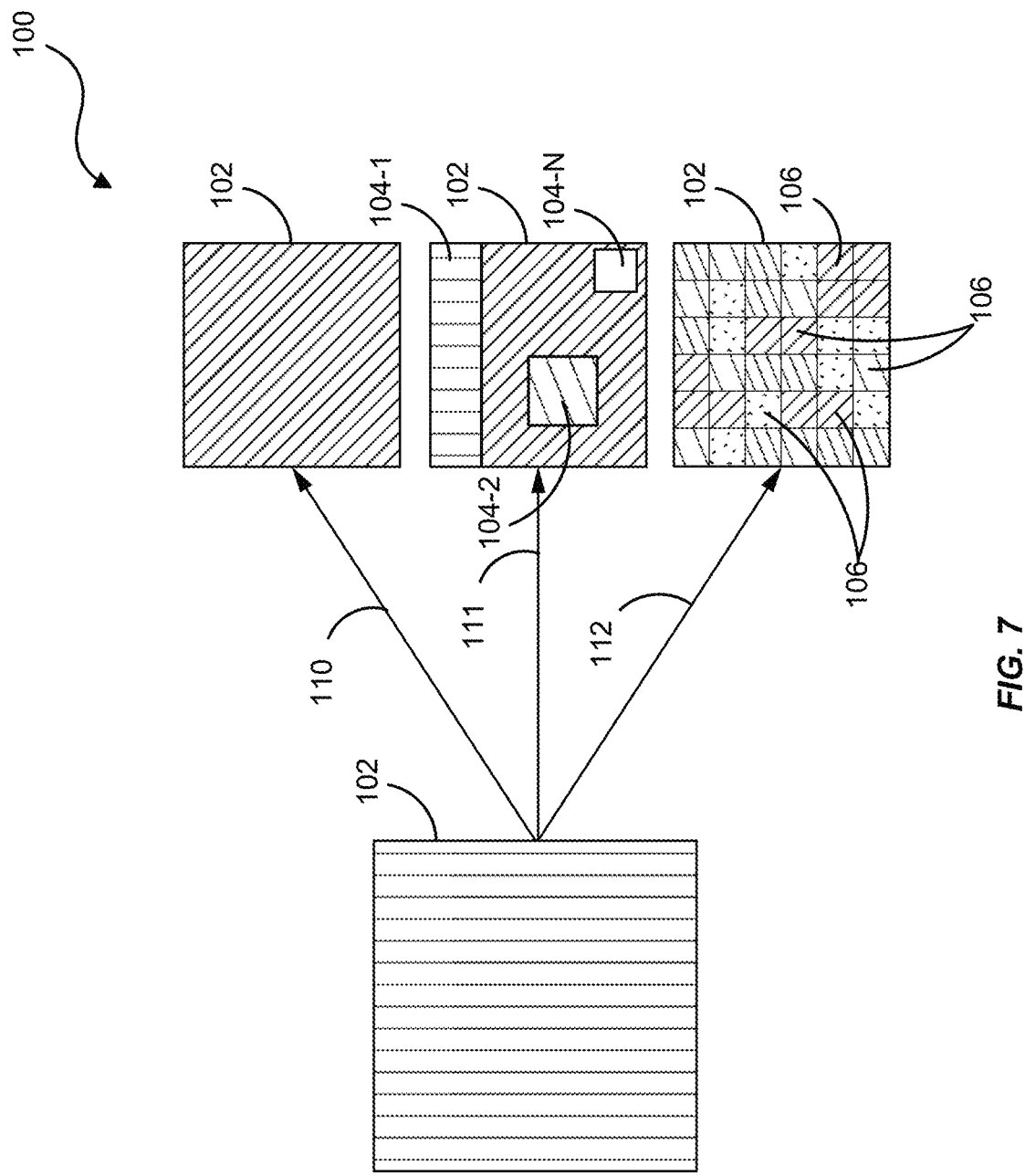
FIG. 7 illustrates exemplary visibility calculations based on portions of obtained camera imagery.

FIG. 7 illustrates visibility calculations based on various portions of camera imagery (e.g., the images from the camera devices 32 and/or 36). For example, the technique of path 110 illustrates an average visibility that was calculated over all pixels of an image 102. The technique of path 111 illustrates visibility that was calculated at various regions 104-1-104-N over the image 102, notionally defined in advance based on an area of interest (AOI). And, the technique of path 112 shows visibility being calculated at each pixel 106 individually. One or more of these techniques may be operable to return a "map" of visibility at each measurement period rather than a single value. And, these techniques may be used to create a modified version of the input imagery to reduce the effects of the meteorological variable of interest (e.g., to provide a "de-fogged" version of the input imagery).

Figure 8:
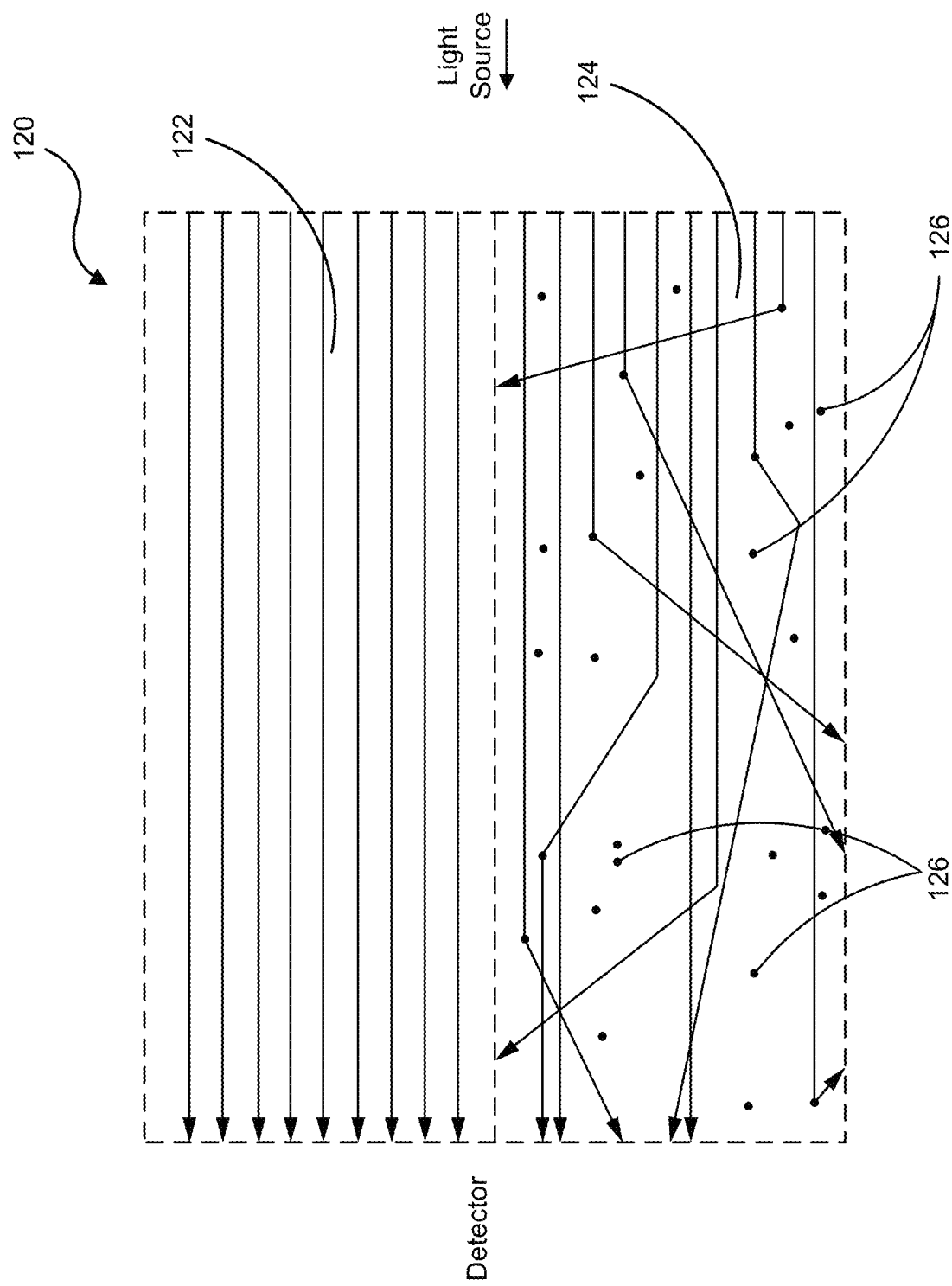
FIG. 8 illustrates volumetric scattering particles in a medium and their impacts on visibility.

FIG. 8 illustrates the impact on visibility from volumetric scattering particles in a medium. In medium 122, light is transmitted from a light source towards a detector as indicated by the arrows of the rays. In this example, the medium 122 is devoid of any volumetric scattering particles. Thus, the light from the light source propagates through the medium 122 without being scattered. But, as can be seen in the medium 124, the medium 124 is filled with particles 126, such as fog, smoke, snow, and/or other aerosols, that are suspended in the medium 124. Thus, when the light from the light source propagates through the medium 124, the light reflects off the particles 126 in an unpredictable manner. These particles 126 can each have a characteristic effect on the transmitted light from the light source. And, the light that is observed may not be as useful for determining characteristics of its source due to redirection and energy loss from scattering.

Figure 9:
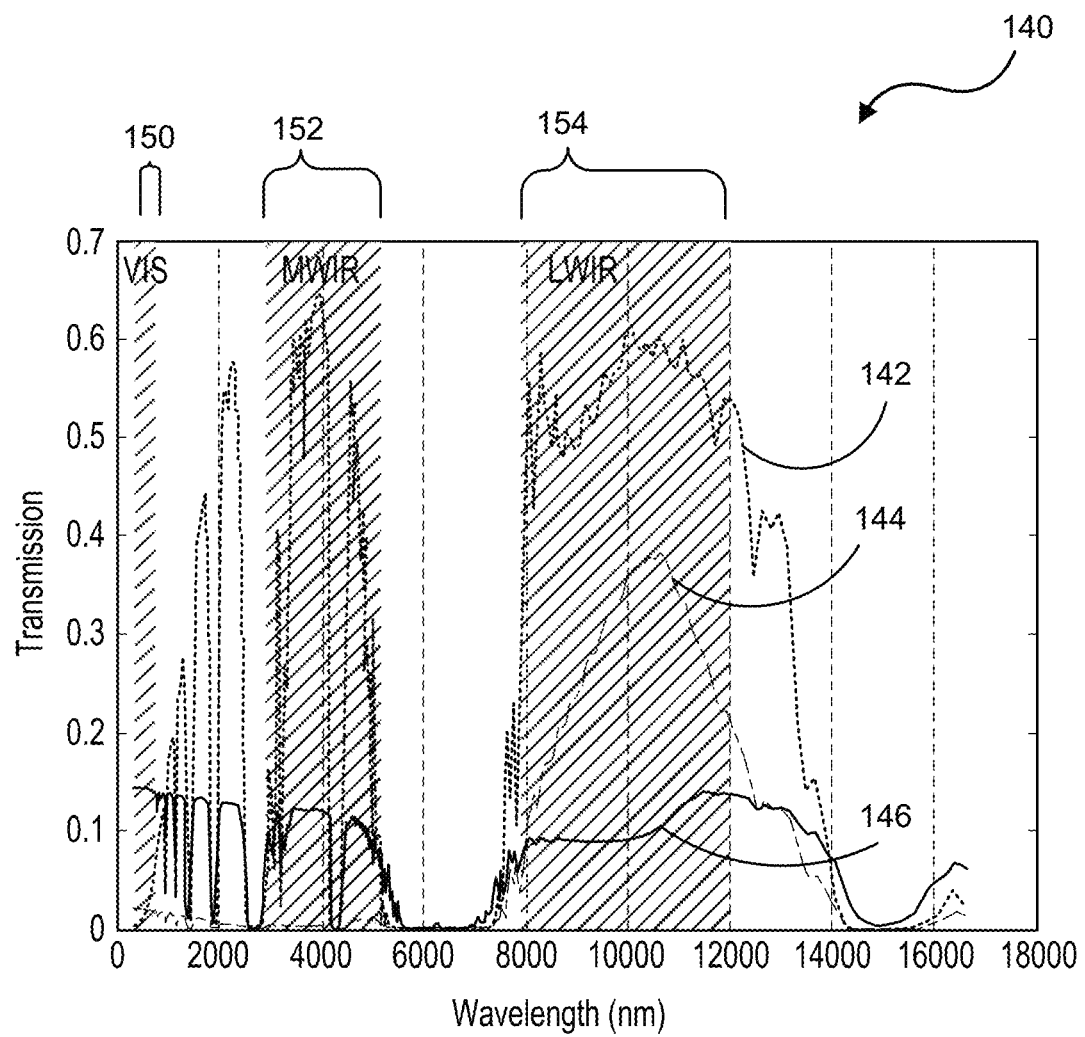
FIG. 9 is a graph illustrating spectral transmissions for CAT I, CAT II, and CAT III fog as predicted by a MODTRAN atmospheric transmission model.

FIG. 9 shows the spectral transmission graph 140 for CAT I, CAT II, and CAT III fog as predicted by a MODTRAN (MODerate resolution atmospheric TRANsmission) atmospheric transmission model. MODTRAN is a computer program designed to model atmospheric propagation of electromagnetic radiation for the 100 $cm^{-1}$ to 50,000 $cm^{-1}$ spectral range (i.e., wavelengths of 0.2 µm to 100 µm).

Long wave infrared sensors mostly image emitted thermal radiance. The fidelity of a thermal image, however, can be affected by atmospheric conditions. For example, fog and rain can severely limit the range of a thermal imaging system due to scattering of light off water droplets. And, a higher density of droplets results in a more degraded infrared signal.

For CAT I fog, transmission in the visible light spectrum (i.e., region 150 with wavelengths between about 0.4 µm-0.75 µm) is significantly lower than in the medium wave thermal infrared window (i.e., region 152 with wavelengths between about 3-5 µm) and the long wave infrared window (i.e., region 154 with wavelengths between about 8-12 µm) as can be seen in plot line 142. In these conditions, thermal imaging cameras can measure detectable contrast differences at a significantly longer distance than visible light cameras can. When the visibility is reduced to CAT II conditions, the MODTRAN model predicts that radiation in the long wave infrared band of region 154 is only partially diminished. This makes the long wave infrared band of region 154 superior to the visible band of region 150 and the medium wave infrared band of region 152, which are almost completely diminished (see e.g., plot line 144). And, in CAT III conditions, each of the bands (i.e., regions 150, 152, and 154) is similarly impacted with minimal transmission, as can be seen in plot line 146.

While transmission limitations in the visible light spectrum make long wave infrared a more desirable choice for a single band system, adding a polarized electro-optical sensor can provide additional degrees of freedom that make an imaging system more robust to varying environmental conditions. For example, in light fog situations, the polarized intensity can be detected by a polarized electro-optical sensor and separated from a signal to remove fog from a scene.

Also, in the visible light spectrum, a captured signal comprises the direct transmission of light reflected off objects in a scene and "airlight". Airlight generally includes all other sources of light that are scattered into a path by the atmosphere, and the scattering effects of obscurants, such as fog. In a maritime environment, the direct transmission component typically comprises light that is received directly from a water's surface, from maritime vessels, and/or from other objects within a field of view. Both direct transmission and airlight generally involve smooth surfaces and generate partial polarization upon reflection. And, the degree of polarization is determined by the angle of incidence.

Generally, on a clear day, airlight is largely made up of sunlight scattered into the field of view through Rayleigh scattering. This type of scattering involves particles that are much smaller than a wavelength of the light being scattered. This type of scattering also has a $1/\lambda^4$ wavelength dependence, and creates a partial polarization. The degree and angle of polarization can be determined by solar geometries and viewing geometries. In the presence of obscurants, however, Rayleigh scattered airlight undergoes multiple scatterings according to Mie theory, which results in a reduction of the degree of polarization. And, as the density of the obscurant increases, the degree of polarization of airlight decreases to zero.

When imaging through light fog, the overall observed intensity contains a polarized component resulting from the direct transmission of light. This intensity also has an unpolarized component resulting from increased scattering. Although some of the captured direct transmission signal is unpolarized, subtracting the unpolarized intensity from an image produces an output of the direct transmission component. This type of imagery can be captured with a multispectral polarimetry system, such as an Airborne Remote Optical Spotlight System-Multi spectral Polarimeter (AROSS-MSP). In cases of heavier fog, only minimal amounts of directly transmitted light reach the sensor. This means that the visible band may be used as a measure of the fog for use in coherent processing with LWIR imagery. In this regard, unpolarized intensity can be used to represent a fog channel.

Then, by examining a time series of imagery, additional degrees of freedom can be exploited. For example, as fog moves through a scene, variations in the thickness of the fog can exist. And, upon transforming the time series into the Fourier domain (k-ω), wavenumber/frequency differences between the fog and the true scene may exist. If a structured fog is moving through the scene at a constant velocity, this fog signal content (e.g., the energy) falls on a plane in k-ω space. In some embodiments, the energy content of the moving fog can be removed with a bandpass filter. In practice, k-ω filtering is effective at removing fast-moving/structured low power effects, such as light fog moving quickly through a scene.

Figure 10B:
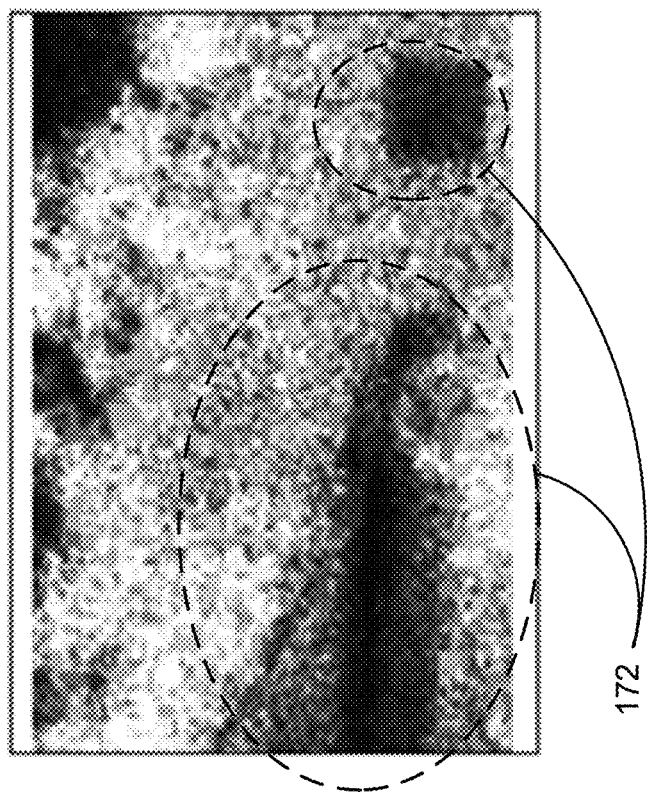
FIGS. 10A and 10B are captured images illustrating the application of principal component analysis (PCA), in one exemplary embodiment.
Figure 10A:
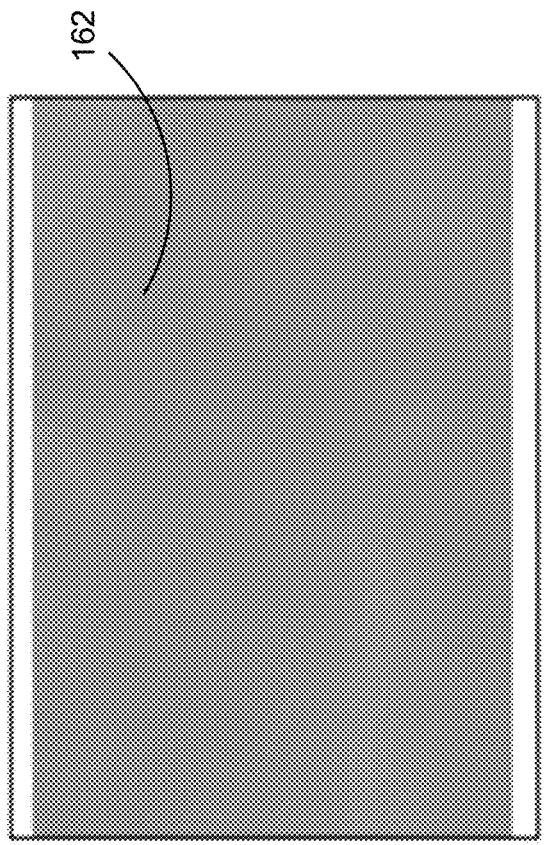

In some embodiments, Principal Component Analysis (PCA) can be used to reveal an object in the scene, as illustrated in FIGS. 10A and 10B. The PCA transforms a set of "N" observations into "N" orthogonal variables defined such that a first PCA component represents a largest possible variance (e.g., structured scene content) and each successive component has the next remaining largest possible variance, provided that the PCA components are orthogonal. For example, consider a measurement model consisting of a vector y (e.g., different bands in multispectral imagery) that consists of a weighted sum of a desired scene content s (i.e., true scene images), a fog image f and noise n. This model can be expressed as:

$$y_i = \alpha_i s + \beta_i f + n_i \text{ for } i=1, \ldots, N.$$

Under a PCA transformation, the first PCA channel contains the highest variance piece. This is generally either s, f, or some linear noise combination, depending on the weighting vectors α and β. In light fog, for example, the fog weighting vector is relatively small and the first PCA channel represents a true scene image s. However, in heavier fog such as that shown in FIGS. 10A and 10B, the fog weighting vector is relatively large and the first PCA channel represents the fog scene f. Compression artifacts and other noise fill in the remaining PCA channels. In order for PCA to be effective at removing the fog, the channels should have some signal content (e.g., the objects 172 in FIG. 10B) because channels without signal add noise. To illustrate, FIG. 10A illustrates a scene with heavy fog 162. After performing the PCA, a majority of the fog 162 is removed to reveal be objects 172 in the scene, as shown in FIG. 10B.

Alternatively or additionally, coherent noise removal can effectively estimate and remove coherent fog that is present in an image. Similar to PCA, consider where there are signal channels that consist of a vector y (e.g., polarized RGB intensity) with some weighted view of relevant scene content (e.g., true scene images). However, assume that the content is corrupted by a weighted fog image f and noise n. Again, these channels can be expressed as:

$$y_i = \alpha_i s = \beta_i f = n_i \text{ for } i=1, \ldots, N.$$

Now, consider that there are fog channels of a vector x (e.g., unpolarized RGB intensity) that contain only weighted fog content f and noise n. These channels contain no signal or only a minimal signal. These channels can be expressed as:

$$x_j = \beta_j f + n_j \text{ for } j=1, \ldots, M.$$

Then, a linear transfer function matrix $H_{yx}$ can be calculated in the Fourier space between the fog channel vector X and the signal channels vector Y, where $Y = H_{yx} X$, and where X and Y are the Fourier transforms of $x_j$ and $y_i$, respectively.

A cross spectral density matrix $G_{yx}$ between the fog channel and the signal may be calculated by multiplying the above expression by X* and then averaging that expression over a support space as:

$$YX^* \rangle = G_{yx} = H_{yx} G_{xx}, \text{ where } G_{xx} = XX^* \rangle.$$

Assuming $G_{xx}$ is not singular, then $$H_{yx} = G_{yx}(G_{xx})^{-1}$$

Figures 11A, 11B, 11C:
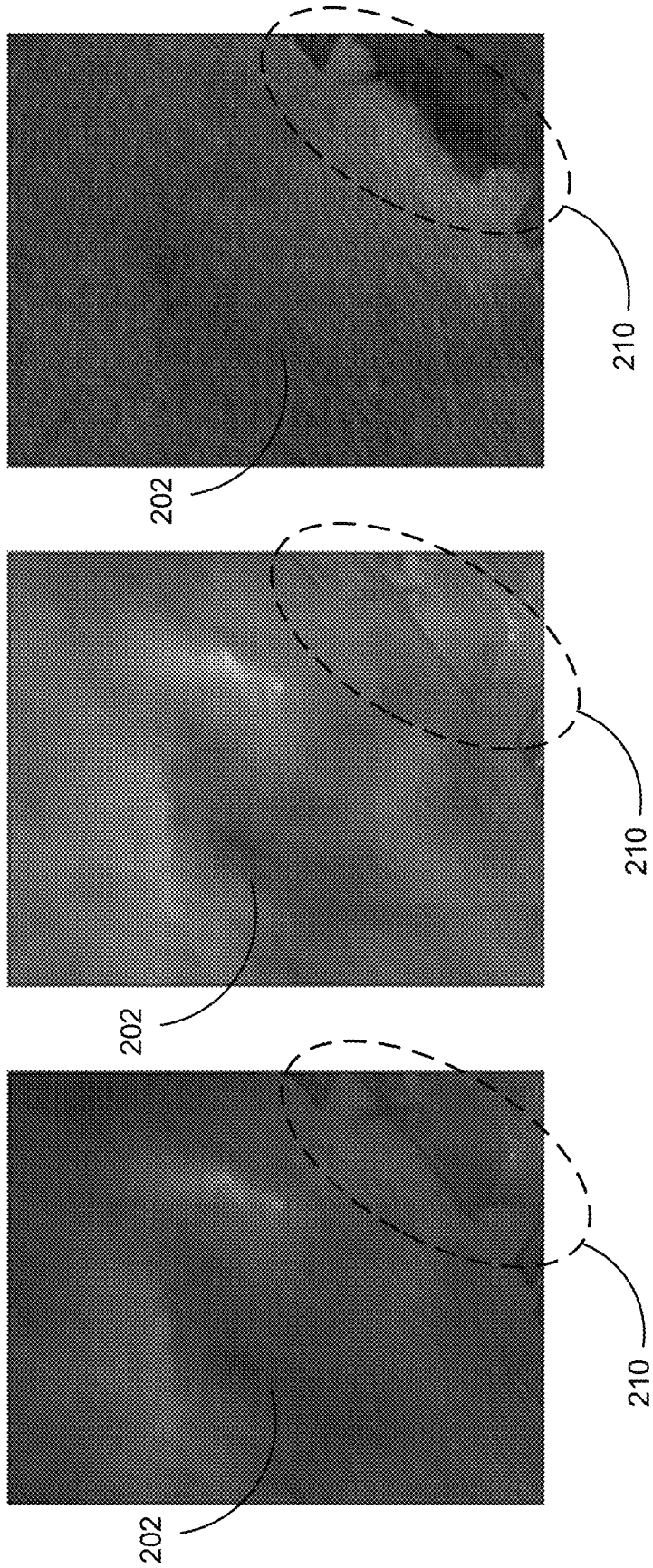
FIGS. 11A, 11B, and 11C illustrate coherent haze estimation and removal being applied to a captured image, in one exemplary embodiment.

After the transfer function is calculated, the transfer function may be applied to the fog channel data in a region of interest to estimate coherent fog in the signal channels so that it can be removed. Under this methodology, any fog that is coherent is removed, leaving behind the true scene, incoherent fog, and noise in the image as illustrated with the progressive fog estimation and removal of FIGS. 11A-11C. In these figures, fog 202 is progressively estimated as coherent noise which is computed and removed as described to reveal the object 210 in the scene. In some embodiments, some remaining signal in the fog channels may lead to minimal signal capture.

In some embodiments, coherent background estimation and removal may be improved with a network of systems 10 so as to estimate and remove the background of an auxiliary image. For example, space-based Overhead Persistent Infra-Red (OPIR) early warning sensors use temporal averaging to reduce scene clutter and noise. The background is dynamic and unpredictable, which leads to lower detection thresholds. One embodiment herein employs a combination of atmospheric modeling and calculations to continually estimate the volumetric scattering clutter for OPIR sensors and provide a constant background estimation and subtraction. This generally results in improved detections.

In some embodiments, local contrast of a "defogged" image is enhanced with a multiscale implementation of a Retinex algorithm. Retinex theory is generally concerned with illumination effects in captured imagery. And, the primary goal of the theory is to decompose a given image into a reflectance image and an illumination image.

The Retinex algorithm is operable to apply two spatial scales, implemented by a "boxcar" smoothing operation, to estimate and eliminate a luminance component and obtain a relatively high contrast reflectance image. This method can be expressed as:

$$R = \log(I) - \log(F^*I).$$

where I is the input image, F*I is the boxcar smoothing operation, and R is the contrast enhanced image.

During an image fusion processing step, outputs from the PCA processing and the coherent fog removal processing can be examined to selectively extract the signal containing the scene. For example, utilizing characteristics of the outputs, such as variance, texture, and spectral signature, image fusion can automatically select a processing result which is most effective at removing any degradation due to fog. In doing so, the first PCA channel for light fog conditions is extracted. Then, the coherent processing output for heavy fog conditions is extracted. For conditions where both algorithms partially remove the fog, a fused result optimizes the output and can be used in further processing.

One method of fusion is using the Mahalanobis distance, which measures the "distance" of a pixel spectrum from a spectral mean, taking into account the possibility of correlations between pixels of different spectral bands. In this embodiment, K is a spectral covariance and c is a spectral pixel vector, which can be expressed as:

$$M^2_d = (\vec{c} - \vec{\mu}) K^{-1} (\vec{c} - \vec{\mu})^T.$$

The output of this algorithm provides personnel, such as mariners and port operators, with up to date views of traffic, obstructions, and conditions.

Additionally, visibility in a scene can be quantitatively measured using a ratio of multi-spectral data. For example, assuming a background is independent of the range of the signal (i.e., the background is dominated by scattered light) and uniformly distributed, the contrast of an image as a function of range can be estimated using a Beer-Lambert relationship for different sensors and the resultant signal to noise ratio (SNR) can be expressed as:

$$SNR = A_0 e^{-L\tau},$$

where L is the range and $\tau$ is the attenuation coefficient. By measuring the contrast ratio between the electro-optical input and the output of the system 10, the attenuation coefficient can be estimated. And, using the Beer-Lambert relationship and the MODTRAN model to estimate atmospheric attenuation for electro-optics and long wave infrared in dense fog, the system 10 can determine a visibility length for a given loss of SNR (e.g., 2% remaining) without the need for a calibrated target in the scene.

Figure 12:
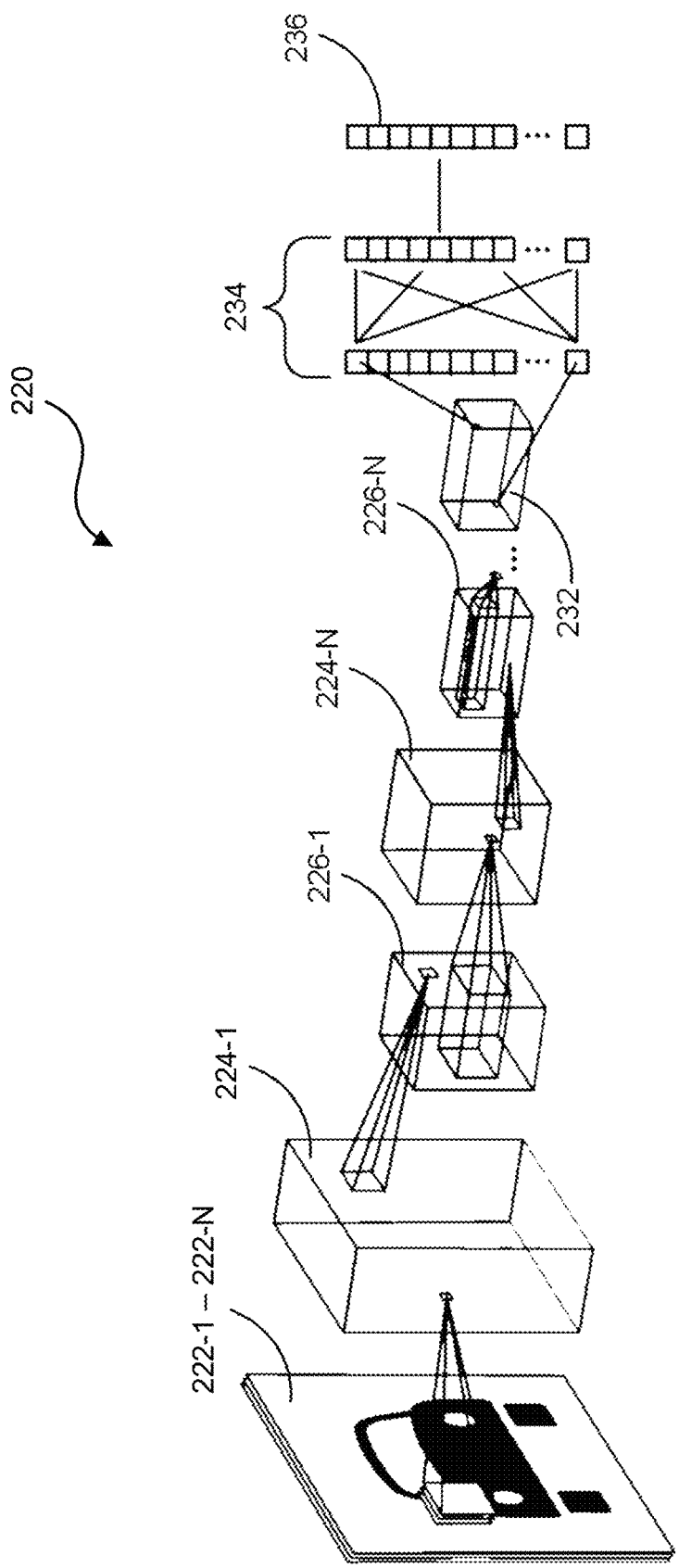
FIG. 12 illustrates one exemplary convolutional neural network (CNN) operable to estimate visibility of a scene from captured images.

In some embodiments, deep learning convolutional neural networks may be used to calculate visibility from camera imagery. FIG. 12 illustrates one exemplary deep learning system 220 that may be used to classify objects seen in imagery. Generally, the deep learning system 220 is trained on real data (e.g., collected imagery). In other embodiments, however, synthetically derived images (e.g., based on a priori knowledge) may be used in conjunction with real data to train the system 220, or may be used to fully train the system 220.

In this embodiment, the system 220 comprises a feature learning component configured from chain of convolution and rectified linear unit (ReLU) modules 224-1-224-N and pooling modules 226-1-226-N (where the reference "N" is an integer greater than one and not necessarily equal to any other "N" reference designated herein). The system 220 also includes a classification module that comprises a deconvolution module 232, a neural network 234, and an output module 236.

The system 220 is first trained with a plurality of input images 222-1-222-N (e.g., thousands of images) having known features and classifications. The convolution modules 224 turn the images 222 into features and the neural network 234 associates predictions with the features. Once trained, another image 222 may be input to the system 220 such that the system 220 can classify features in the image 222 (e.g., objects in a scene). In one embodiment, the system 220 is trained using TensorFlow software operable in a Red Hat 7 Linux operating system on an Nvidia Titan X GPU and a python front-end.

This general approach can be extended to analysis of hyperspectral or multi-spectral images. For example, hyperspectral and multispectral imagery can be formed from the same scene being observed as a series of channels sensitive to different wavelength ranges. One example of multispectral imagery includes an RGB (red, green, blue) image obtained from a standard digital camera. The "R" channel measures the amount of light reaching the imaging sensor in wavelengths centered around the color red, the "G" channel measures the amount of light reaching the imaging sensor in wavelengths centered around the color green, and the "B" channel measures the amount of light reaching the imaging sensor in wavelengths centered around the color blue.

Alternatively or additionally, the system 220 may be configured to operate on three-dimensional (3D) data and utilize 3D convolutions to extract image thumbnails across all spectral modalities. The 3D convolutions turn hyperspectral stacked images into features. In some instances, it may be desirable to simulate the collection of hyperspectral data by "stacking" images of the same scene as observed using different modalities, such as electro-optical and infrared, and/or different polarizations.

This general approach can be followed for processing imagery from a long wave infrared camera and a polarization sensitive camera (e.g., or other general multi-wavelength and polarization sensing combinations). Images may be obtained from a scene at substantially the same time using multiple sensor devices/cameras. These devices may include one long wave infrared image and multiple polarization visible images, including Full Stokes I, Q, U, and P polarizations (e.g., a total of five images). However, the polarization images may be formed in any number of polarization basis. Other infrared camera images may also be added in some embodiments. For example, additional cameras, such as medium wave infrared and/or short wave infrared cameras may be used.

Figure 13:
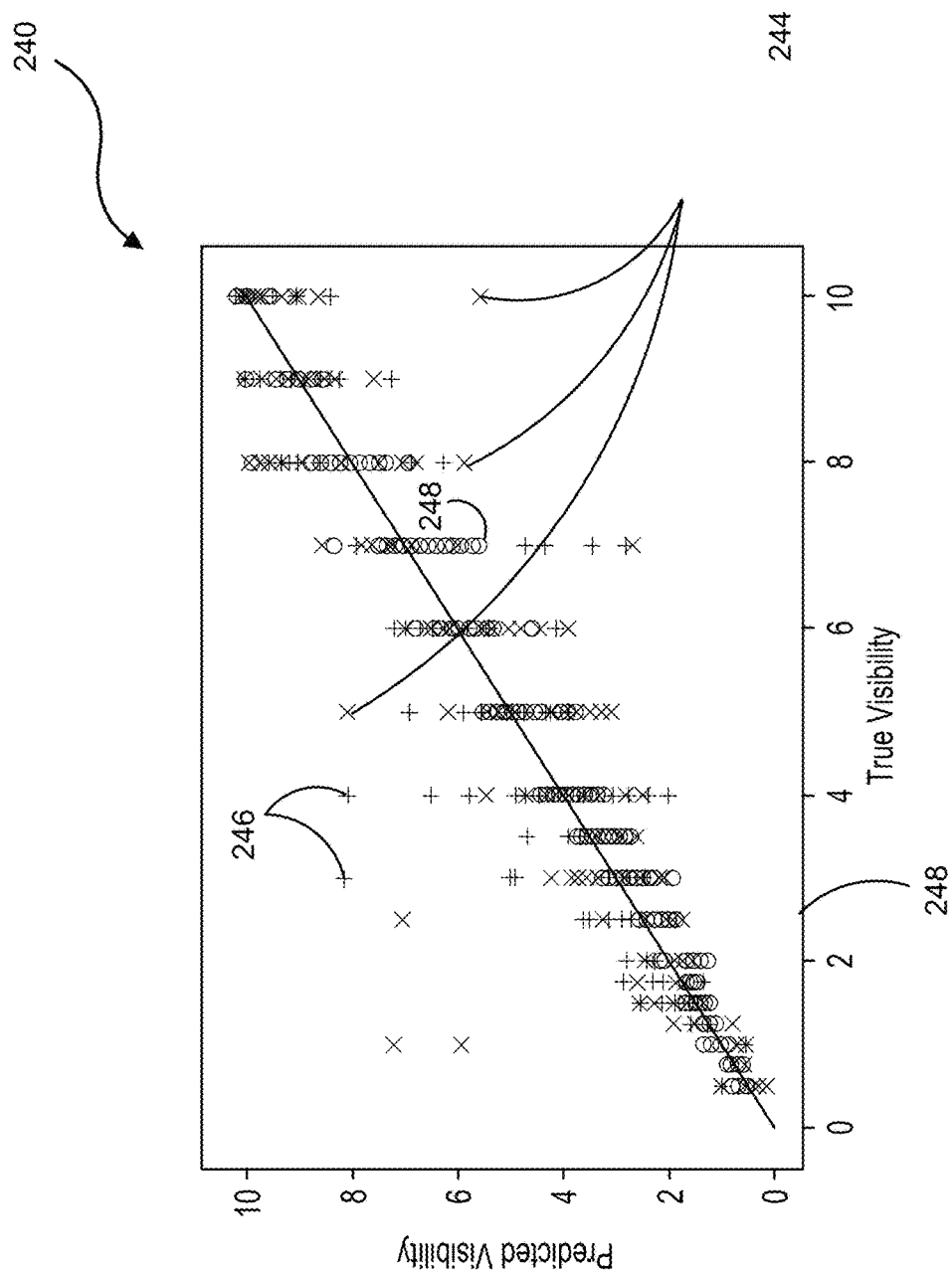
FIG. 13 is a graph illustrating visibility estimation performance of a neural network using hyperspectral processing.

The system 220 handles the images by processing them through a multispectral neural network as a multispectral stack. 3D convolutions may then be used to build nonlinear combinations of 2D images. The images may then be passed through convolution and dense network layers resulting in the output of a real number trained to match the measured visibility reported from a federal Aviation Administration airport tower in the field of regard of the sensor. The visibility measurement was reported in units of miles. Results of one particular instance of this process are shown in the graph 240 of FIG. 13, where network outputs are plotted on the y-axis (i.e., predicted visibility) as a function of ground truth reports (i.e., true visibility) obtained on the scene. The "●" 248 represent training data, whereas the "X" symbols 244 represent test data and the "+" symbols 246 represent validation data.

In this embodiment, the system 220 is configured as a series of layered 3D and/or 2D convolution modules 224 and pooling modules 226 as dense network layers, as shown in FIG. 12. The entire network is configured to be relatively lightweight using less than 250,000 parameters. Batch normalization may be used to adjust neuron activation and aid in training speed, with dropout regularization processes being omitted. This approach provides robust performance in the presence of signal outliers. And, the volumetric scattering estimate is represented by the system 220 using a final dense layer. The parameters are optimized using a minimized mean squared error for the total batch.

The training of the system 220 may randomly use half of the total images as a training set (i.e., the symbols 248), with a quarter of the images being reserved for testing (i.e., symbols 244), and another quarter of the images being reserved for validation (i.e., the symbols 246). The testing dataset may be evaluated after each full training cycle while the validation dataset may be evaluated only at the end of the training process. The network training process is deemed to be sufficient when the total loss error metric is consistent between testing and training datasets, and the performance is in line with volumetric scattering requirement definitions.

Figure 14:
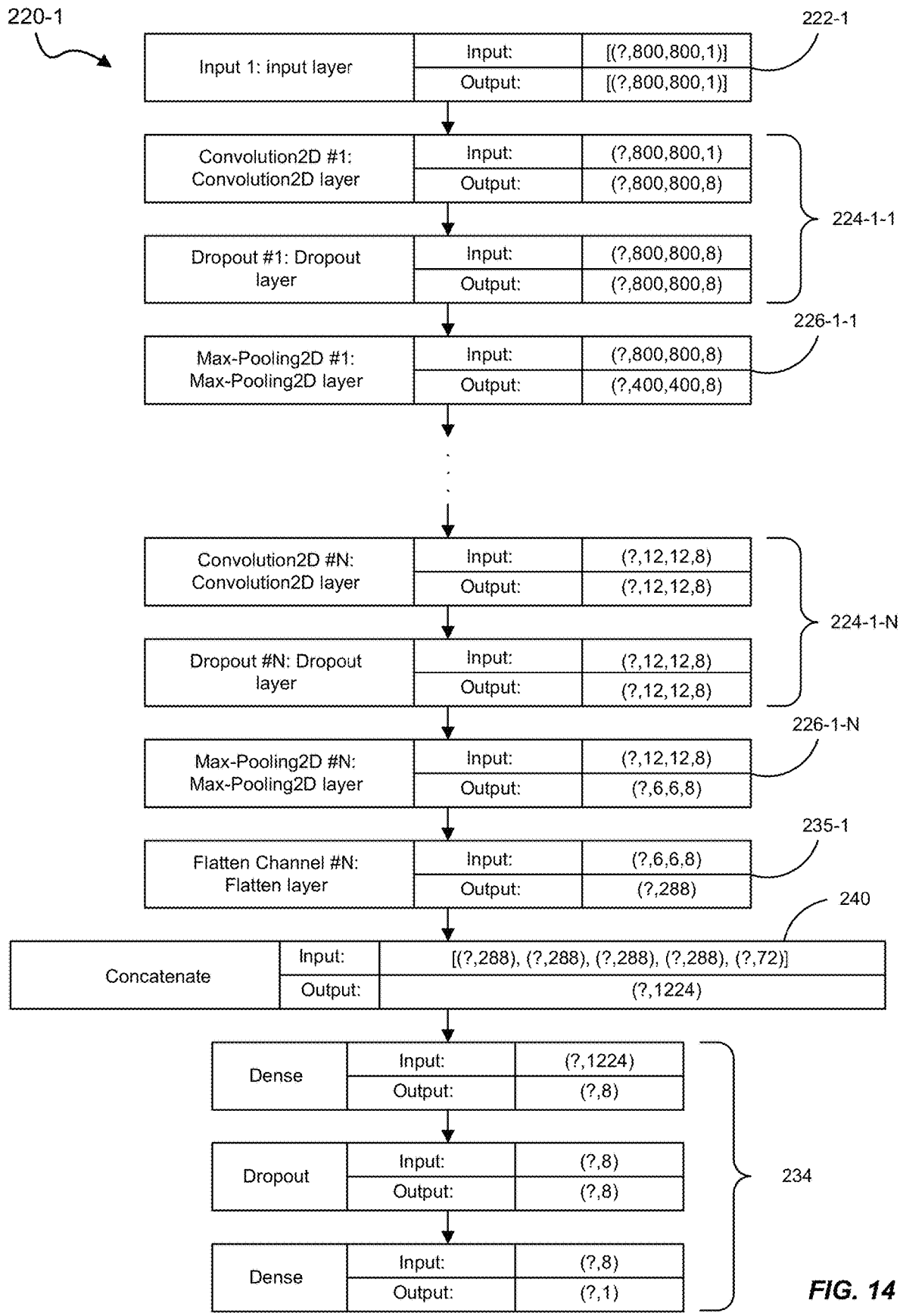
FIG. 14 is a block diagram of a channel of a CNN for parallel image processing, in one exemplary embodiment
Figure 15A:
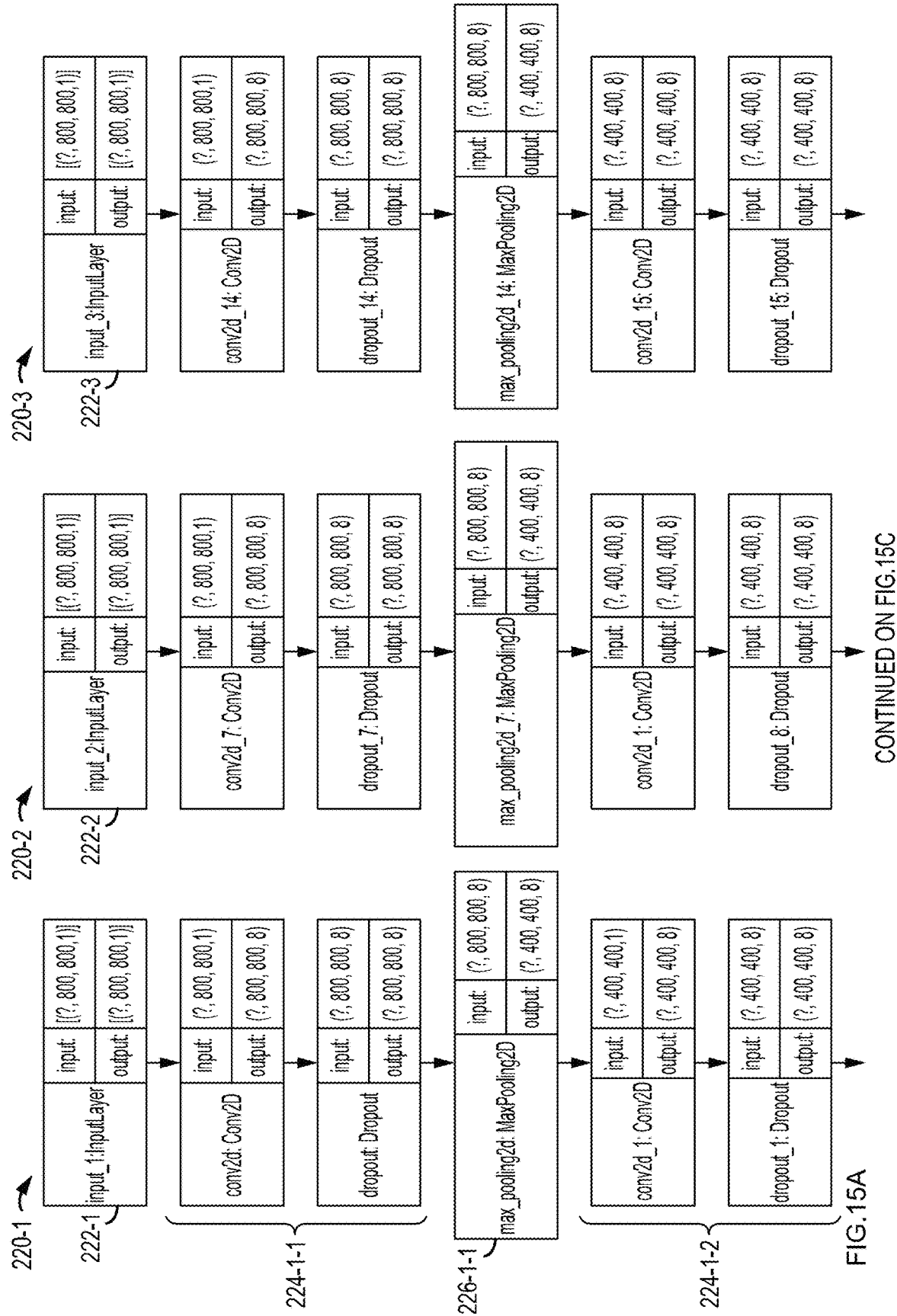
FIGS. 15A-15J represent a block diagram of the network architecture for parallel image processing, in one exemplary embodiment.
Figure 15B:
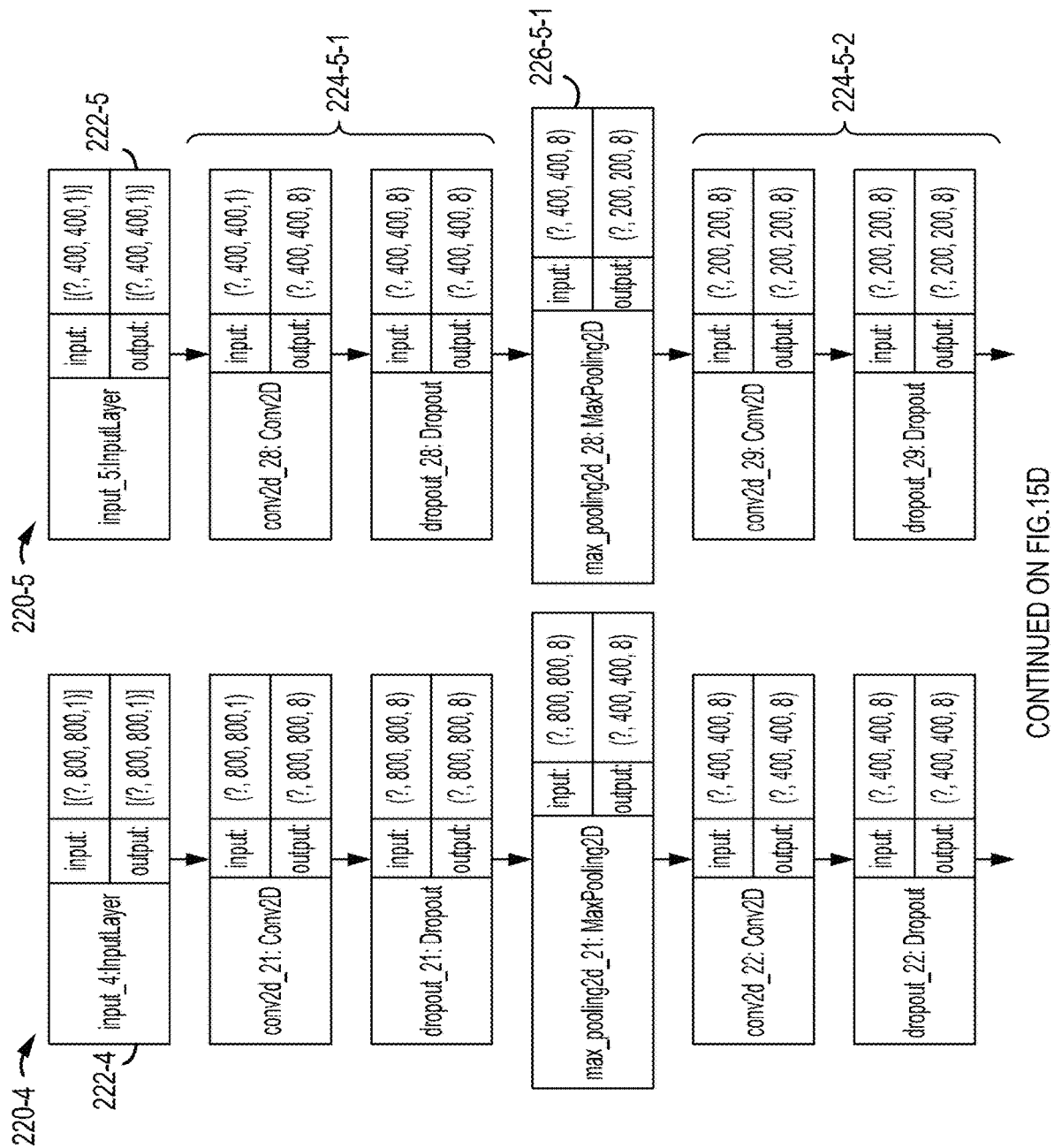
Figure 15C:
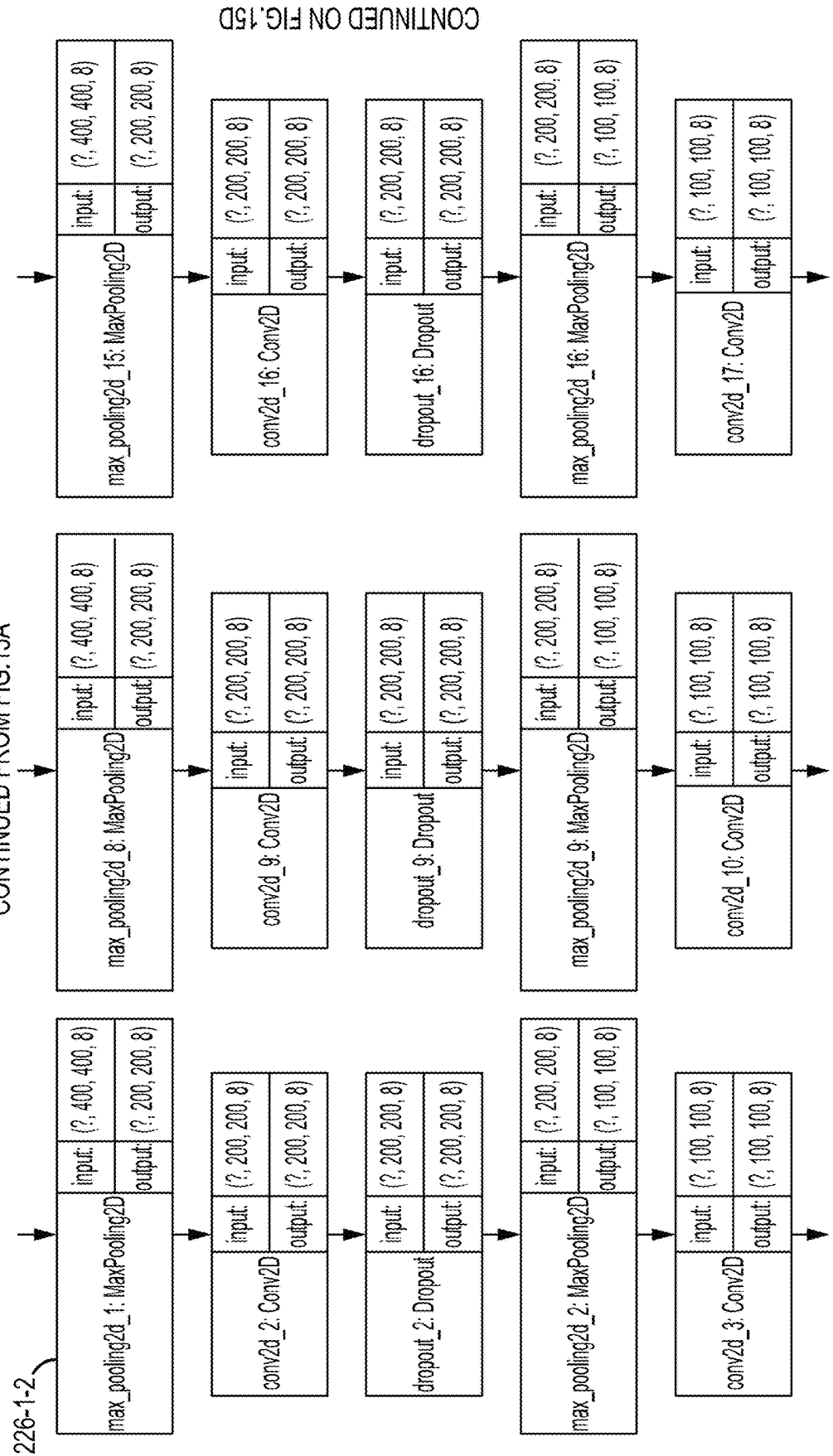
Figure 15D:
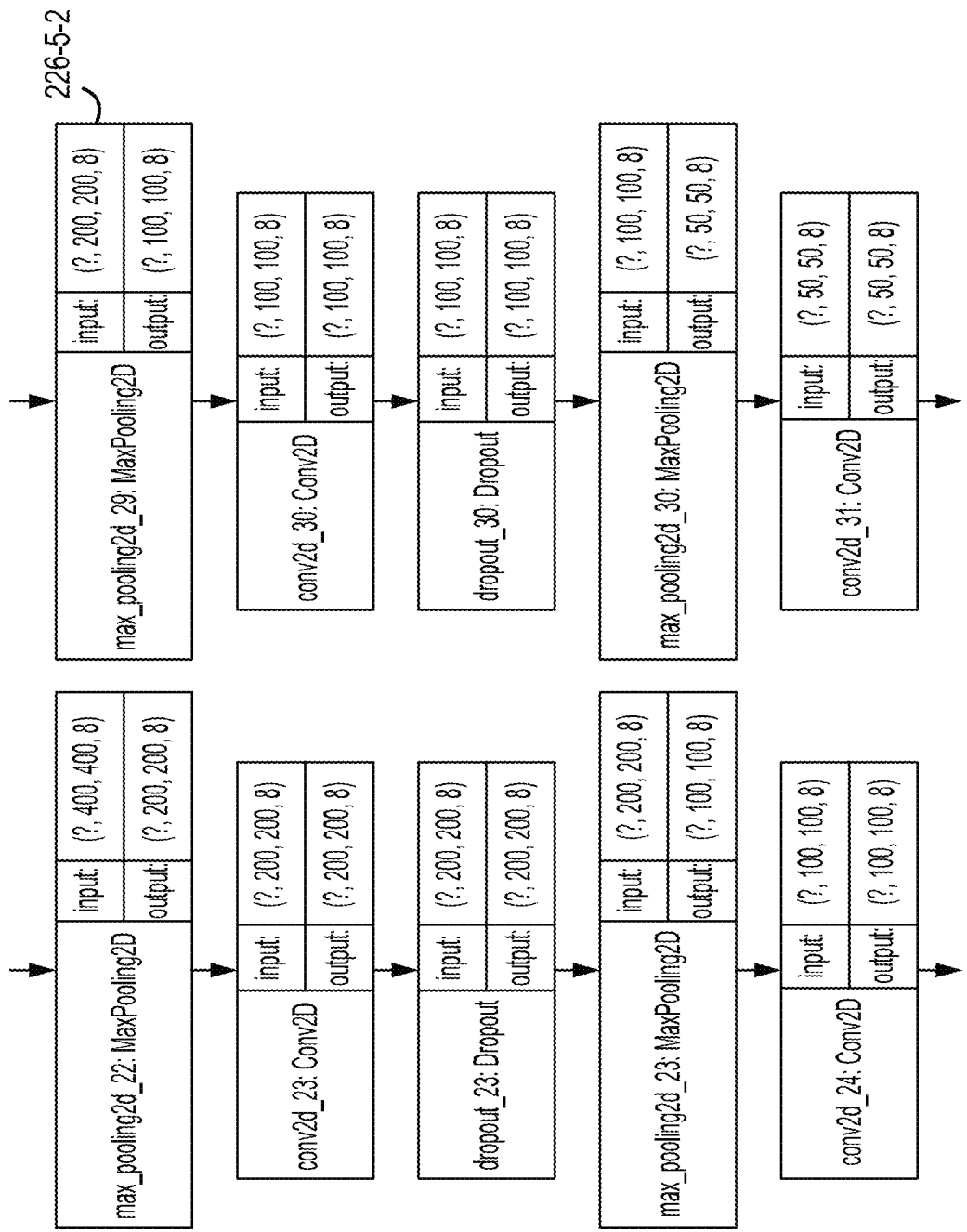
Figure 15E:
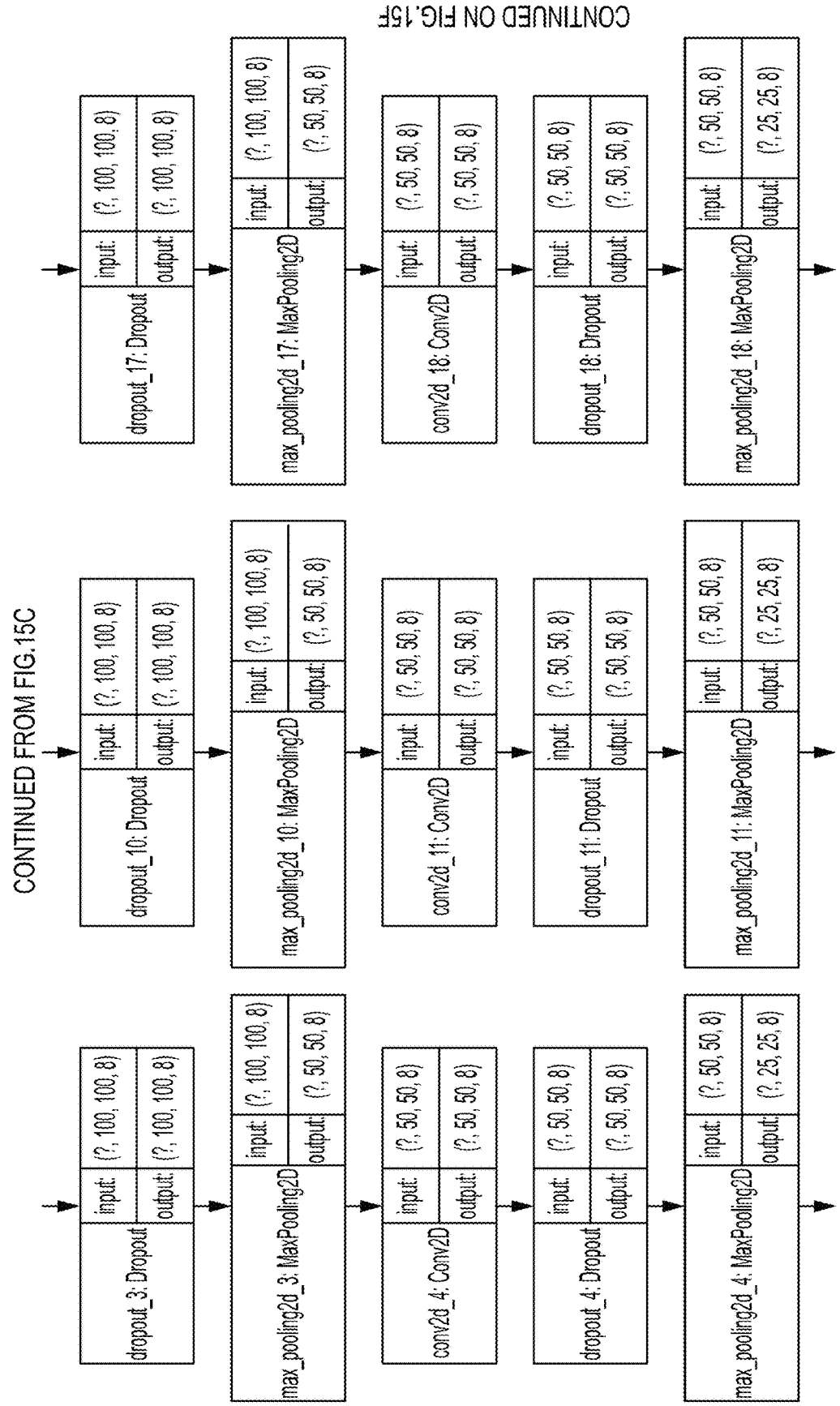
Figure 15F:
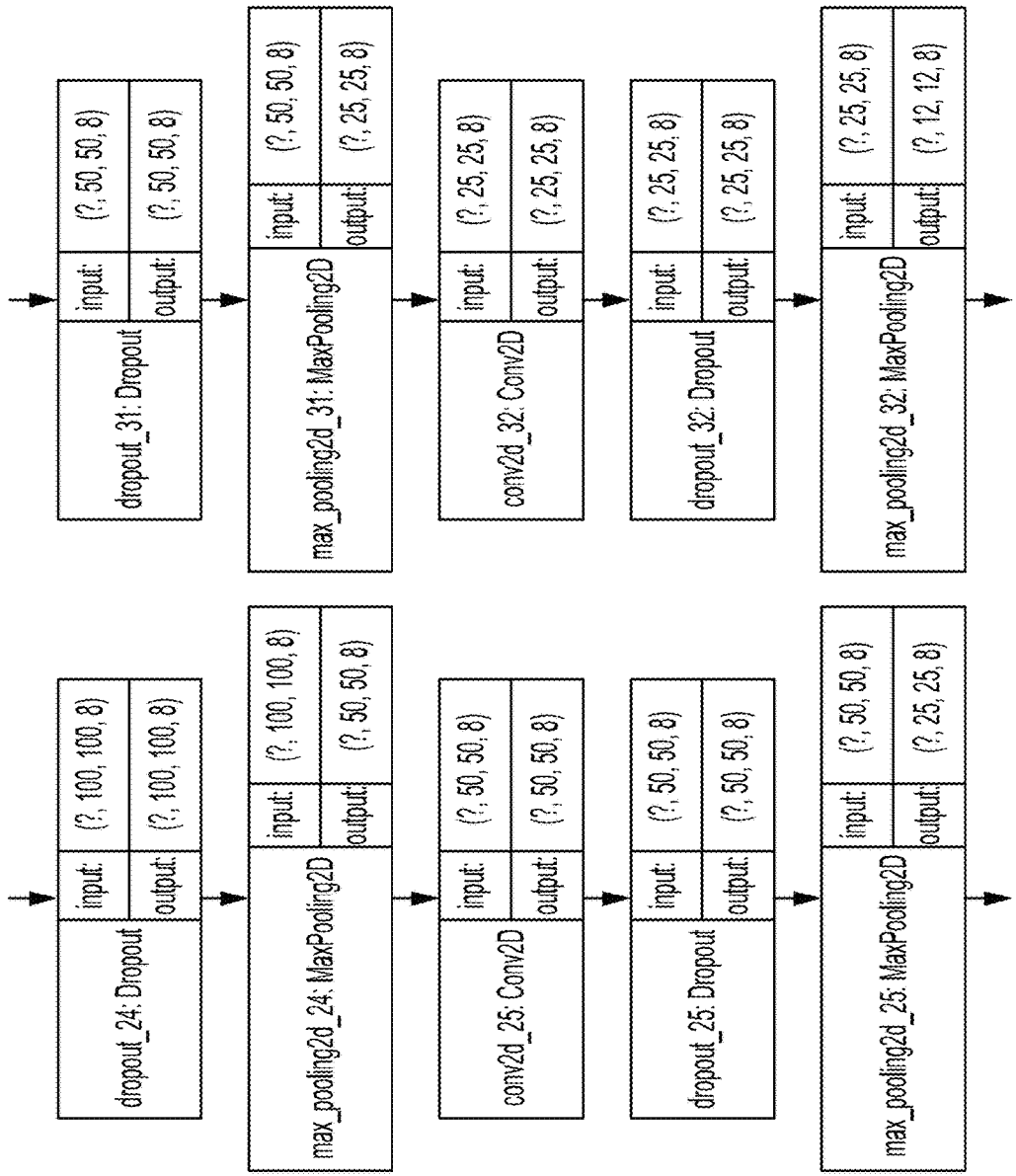
Figure 15G:
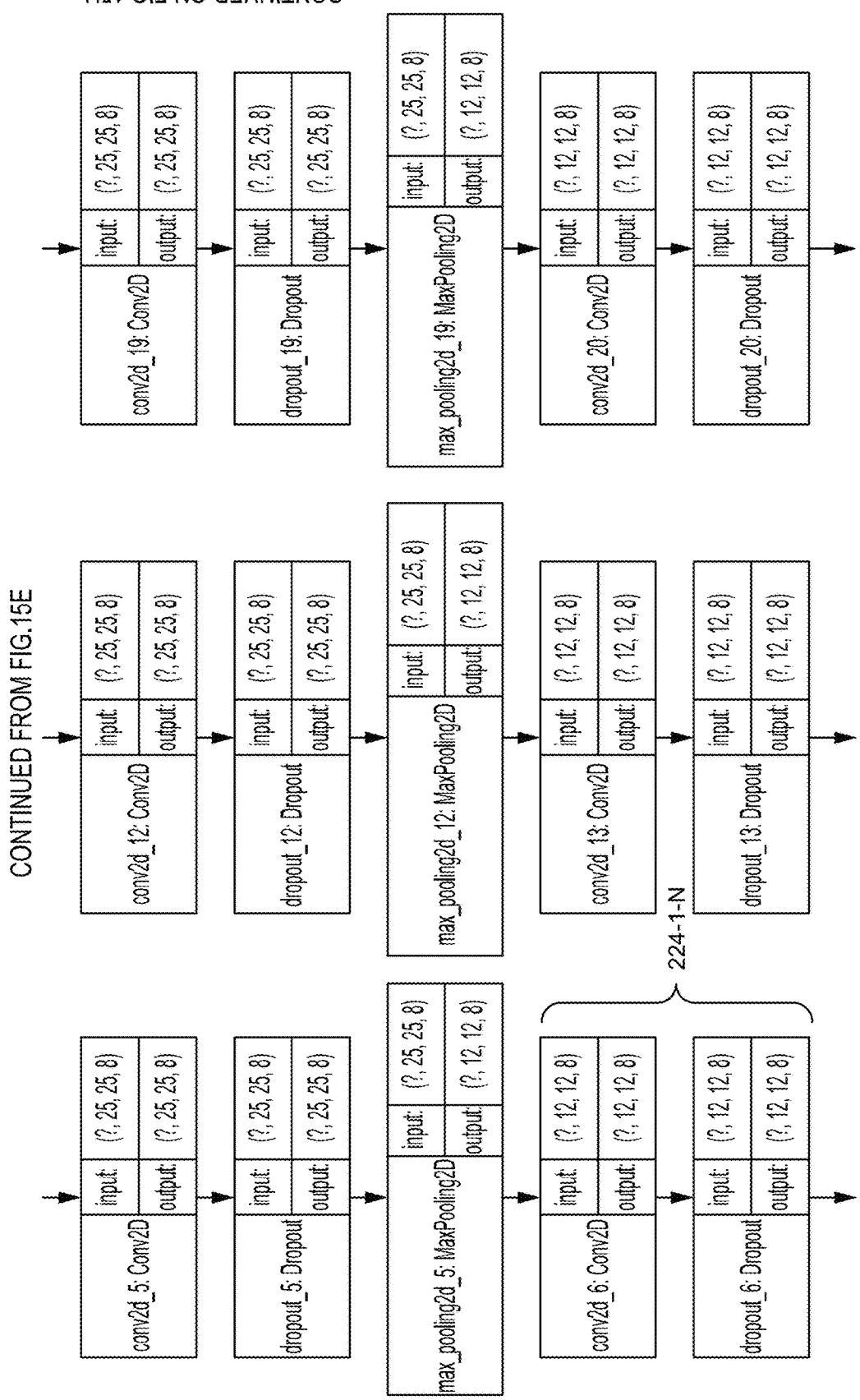
Figure 15H:
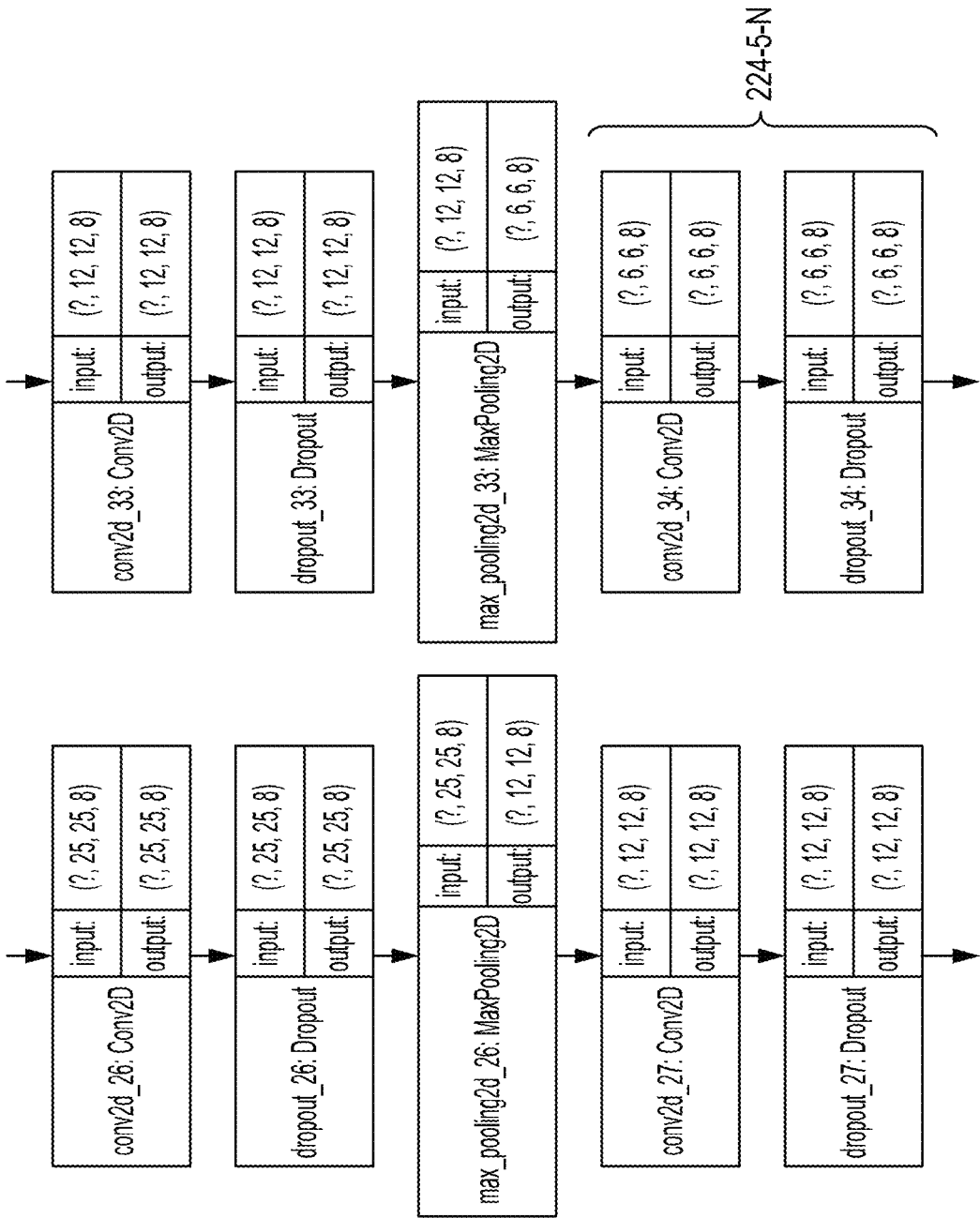
Figure 15I:
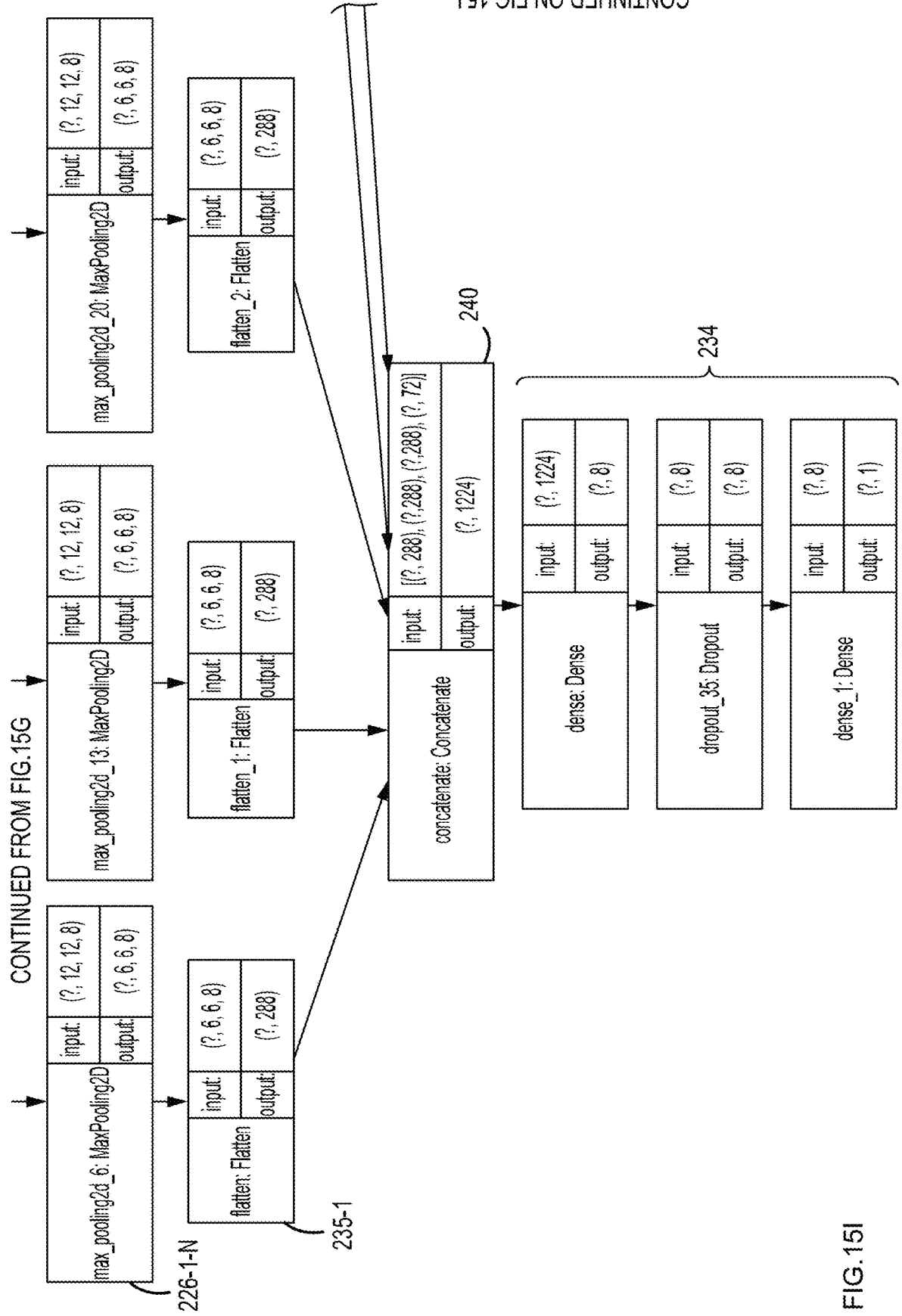
Figure 15J:
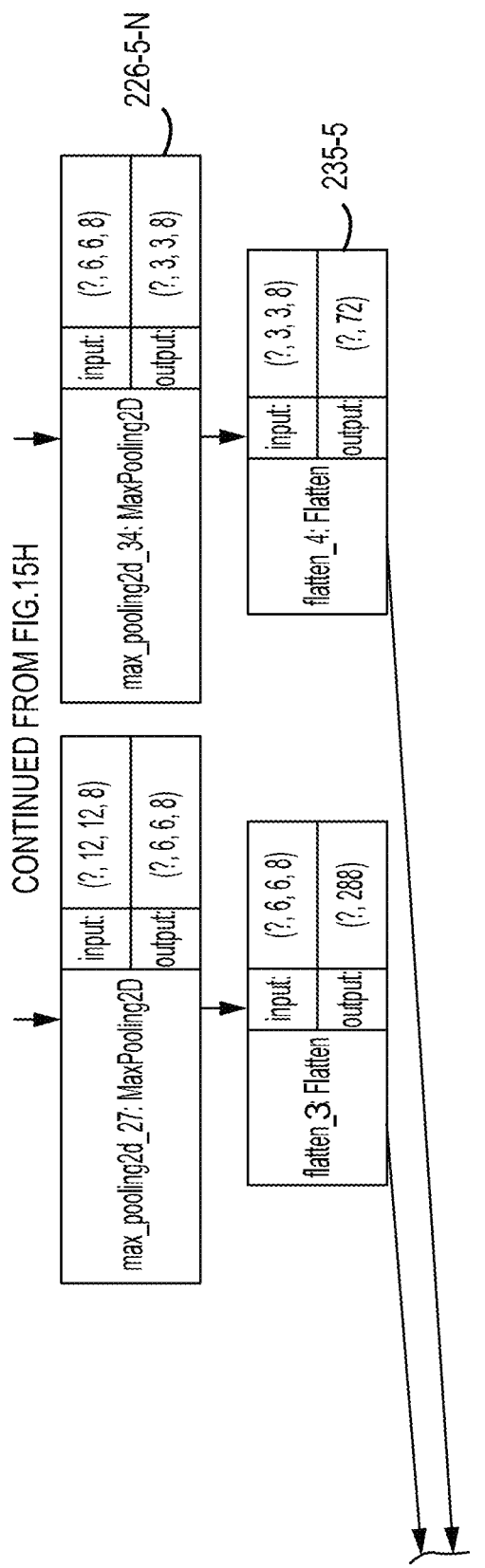

In some embodiments, deep learning may be applied to visibility estimation to process images through parallel CNNs, followed by a combination of network outputs, as illustrated in FIGS. 14 and 15. For example, the CNN may initially input one long wave infrared image and four different polarized images, each with its own degree of polarization (i.e., 0, 45, 90, and 135 degrees). These five images may then be input through five separate 2D convolutional layers using a ReLU activation function. The convolutional layers then feed into five dropout layers. And, the five dropout layers then feed into a 2D max pooling layers. This process may then be repeated a plurality of times for each input until the five separate branches concatenate together and are then fed into a densely connected layer. The output of this densely connected layer may then be fed into one final dropout layer, which feeds into another final densely connected layer and gives the visibility output from the network.

To illustrate, FIG. 14 shows one channel 220-1 of the deep learning system 220 of FIG. 12. At the input layer 222-1, the channel 220-1 receives one of the five input images, where the "-1" of the reference number "222-1" represents the channel number, as also seen in FIGS. 15A-15J. And, each of the other channels 220-2-220-5 receives one of the remaining four images. Again, the five 2D images were obtained with their respective camera devices/sensors at substantially the same time, the image data of each of which being formatted in a rectangular matrix of pixels. From there, the image passes through a first 2D convolution and ReLU layer 224-1-1 and a 2D max pooling layer 226-1-1 to learn features of the input image. In this process, the convolution 224-1-1 convolves the input image and passes its result to a next layer of the CNN, and a dropout is performed to drop or remove nodes of the CNN because a fully connected layer occupies most parameters and is prone to overfitting. Removed nodes are subsequently reinserted into the network with their original weights. Pooling, via the 2D max pooling layer 226-1-1, may then be performed to reduce the matrix dimensions of data by combining the outputs of neuron clusters at one layer into a single neuron in a next layer. In this regard, the channel 220-1 performs a max pooling that uses the maximum value of each local cluster of neurons in the feature map, while average pooling takes the average value. This process continues until the Nth 2D max pooling layer 226-1-N is complete.

The resultant matrix of extracted feature data from the series of the layers 224-1 and 226-1 is flattened into a vector via flattening layer 235-1 for object classification. For example, fully connected layers connect a neuron in one layer to the neurons in another layer. And, a flattened matrix goes through a fully connected layer to classify the images. Before this classification takes place, however, the flattened matrices of the other channels 220-2-220-5 (i.e., FIGS. 15A-15J) are concatenated with the flattened matrix of the channel 220-1 via a concatenation layer 240. Once the flattened matrices of the channels 220-1-220-N are concatenated, the output can be passed through the neural network 234 for classification and then output through the output layer 236.

While shown or described with respect to five channels operating on five images, the embodiments herein are only intended to be exemplary as the numbers and types of images may be selected as a matter of design choice. For example, the system 220 could be configured to operate on a RGB image comprised of separate red, green, and blue images, as well as two polarization images of 0° and 90° polarization. As such, the system 220 would be configured with five channels 220-1-220-3 to process the images. Alternatively, the system 220 could be configured with seven channels to operate on a red, green, and blue images, as well as four polarization images of 0°, 45°, 90°, 135°.

Figure 16:
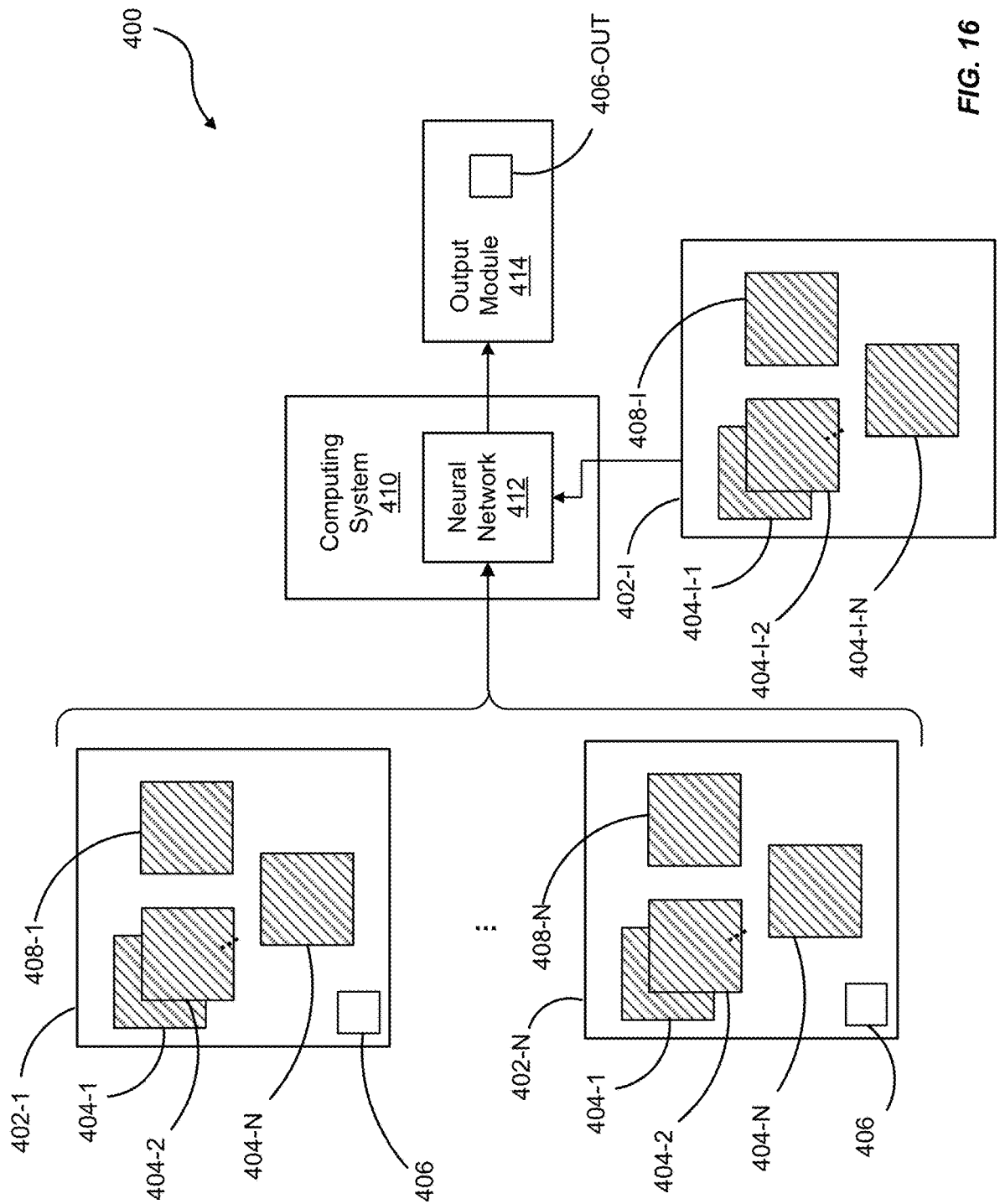
FIG. 16 is a block diagram of a system for machine learning a visibility parameter of a scene.

FIG. 16 is a block diagram of another exemplary system 400 operable to predict a visibility indicator of an image. For example, the system 400 may be communicatively coupled to two or more cameras to receive an input image set 402-I taken from a scene (where the reference "I" indicates an input image of the scene being interrogated by the cameras). The cameras may include: an LWIR camera operable to capture an LWIR image 408 of the scene, and one or more polarization cameras operable to capture a corresponding number of polarization images 404-1-404-N of the scene. Each polarization image 404 of an image set 402 may comprise a different polarization.

In this embodiment, a computing system 410 is operable to implement a neural network 412 that processes the image set 402-I to determine a visibility indicator of the image set 402-I and thus the visibility of the scene. In this regard, the computing system 410 may access a storage element to retrieve a plurality of other image sets 402-1-402-N comprising images that are comparable to the image set 402-I. For example, the image sets 402-1-402-N may also comprise longwave infrared image 408 and polarization images 404. Each of the image sets 402-1-402-N may also have a corresponding visibility indicator 406 that has been validated in some way (e.g., as described above). The computing system 410 may train the neural network 412 with the image sets 402-1-402-N and then process the image set 402-I through the trained neural network 412 so as to predict a visibility indicator 406-OUT for the image set 402-I, which may then be output to an output layer 414.

In some embodiments, the image set 402-I may be observed in real time so as to produce a visibility indicator of the scene in real time. That is, as the images of the image set 402-I are captured by the cameras, the image set 402-I may be immediately generated and input into the neural network 412 to predict the visibility indicator 406-OUT as the cameras captures the scene. However, the visibility indicator 406-OUT may also be predicted for the image set 402-I as part of postprocessing.

In either case, once the visibility indicator 406-OUT of the image set 402-I has been predicted, the image set 402-I may then be used as training data for subsequent image sets 402-I. In this regard, the image set 402-I (as well as the image sets 402-1-402-N) may be used for either periodic or episodic training of the neural network 412 as shown and described above.

In some embodiments, one or more of the images of the image sets 402-1-402-N used to train the neural network 412 may correspond to the same scene as the image set 402-I. However, the images of the image sets 402-1-402-N can also be different from the scene as the image set 402-I.

Generally, neural networks, such as the neural network 412, lend themselves to various forms of parallel processing so as to expedite the training of the neural network. Some hardware implementations that may be used to implement the neural network 412 within the computing system 410 include graphics cards capable of such parallel processing. However, the neural network 412 may be implemented in any combination of hardware and software.

While the embodiments disclosed herein are helpful in providing accurate atmospheric visibility measurements, the embodiments may also provide atmospheric transmission related parameters including specific parameters and units of measurement that may be used for system training. Additionally, the embodiments herein are not limited to terrestrial outdoor measurements. Rather, the embodiments herein can be used for measurement of optical transmission and visibility in any environment that may be subject to variable scattering and attenuation effects, including indoors and underwater.

Figure 17:
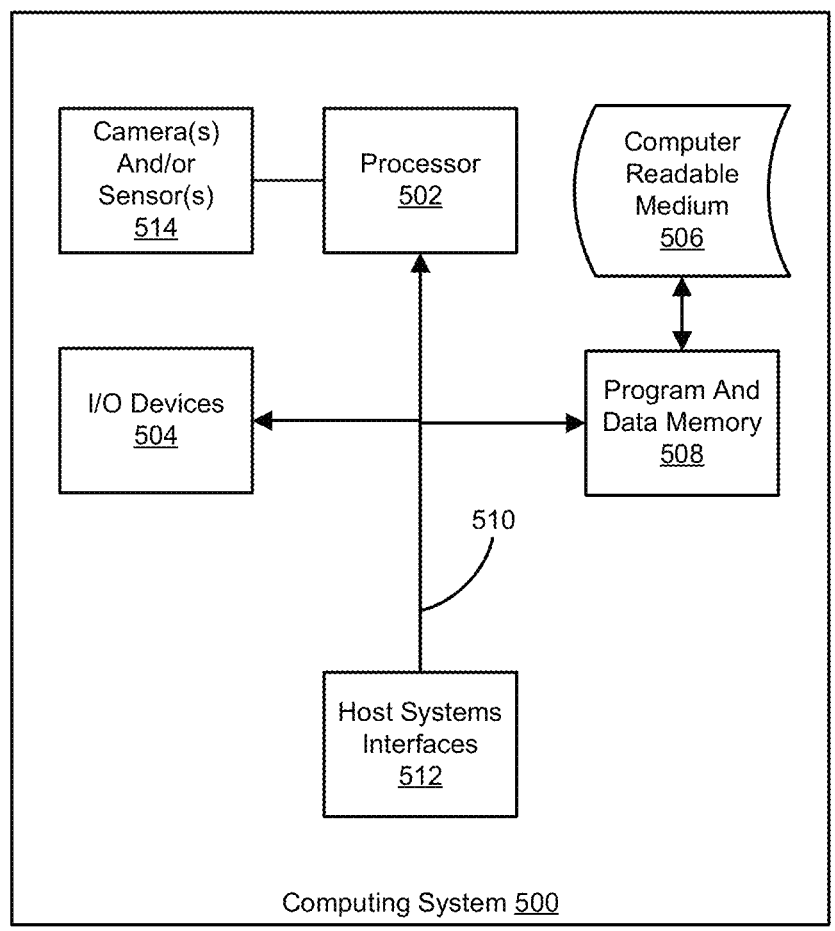
FIG. 17 is a block diagram of an exemplary computing system in which a computer readable medium provides instructions for performing methods herein.

Any of the above embodiments herein may be rearranged and/or combined with other embodiments. Accordingly, the concepts herein are not to be limited to any particular embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 17 illustrates a computing system 500 in which a computer readable medium 506 may provide instructions for performing any of the methods disclosed herein.

Furthermore, the embodiments can take the form of a computer program product accessible from the computer readable medium 506 providing program code for use by or in connection with a computer or any instruction execution system. For the purposes of this description, the computer readable medium 506 can be any apparatus that can tangibly store the program for use by or in connection with the instruction execution system, apparatus, or device, including the computer system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), NAND flash memory, a read-only memory (ROM), a rigid magnetic disk and an optical disk. Some examples of optical disks include compact disk-read only memory (CD-ROM), compact disk-read/write (CD-R/W) and digital versatile disc (DVD).

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the computing system 500 to become coupled to other data processing systems, such as through host systems interfaces 512, or remote printers or storage devices through intervening private or public networks. Modems, cable modem and Ethernet cards are just a few of the currently available types of network adapters.

What is claimed is:

1. A system, comprising:
a first camera device operable to capture a plurality of images of a scene at a first band of wavelengths;
a second camera device operable to capture a plurality of images of the scene at a second band of wavelengths, wherein the first and second bands are different; and
a processor communicatively coupled to the first and second camera devices, the processor being operable to detect an object in the scene based on a first image of the plurality of images from the first camera device and based on a first image of the plurality of images from the second camera device that was captured at substantially a same time as the first image from the first camera device, to estimate an obscurant in the scene based on the first image from the first camera device and the first image from the second camera device, and to estimate a visibility of the scene based on the object and the estimated obscurant,
wherein the first band of wavelengths comprises visible light, the second band of wavelengths comprises long wave infrared light, and the first camera device is a polarization sensitive camera device operable to capture full Stokes polarization.

2. The system of claim 1, wherein:
the processor is further operable to perform a principal component analysis on the first image from the first camera device to detect the object in the scene.

3. The system of claim 1, wherein:
the processor is further operable to estimate coherent noise in the first image from the first camera device and the first image from the second camera device, and to remove the coherent noise from at least the first image from the first camera device.

4. The system of claim 1, wherein:
the processor is further operable to estimate the visibility based on volumetric scattering and attenuation of the obscurant.

5. The system of claim 1, wherein:
the obscurant is fog.

6. The system of claim 1, further comprising:
a storage device operable to store a plurality of image sets, wherein each image set comprises an image from the first camera device and an image from the second camera device captured at substantially a same time as the image from the first camera device,
wherein:
the processor is further operable to implement a machine learning module, to train the machine learning module with the image sets, to process the first image from the first camera device and the first image from the second camera device through the trained machine learning module to estimate a visibility of the scene.

7. The system of claim 6, wherein:
the machine learning module comprises a convolutional neural network.

8. The system of claim 1, wherein:
the processor is further operable to enhance contrast of at least the first image from the first camera device.

9. The system of claim 1, wherein:
the processor is further operable to store the first image from the first camera device and the first image from the second camera device as an image set for training a machine learning module.

10. The system of claim 1, wherein:
the processor is further operable to update the estimated visibility of the scene using subsequent images from the first and the second camera devices.

11. The system of claim 10, wherein:
the processor is further operable to remove at least a portion of the obscurant from the scene in the subsequent images, and to display the subsequent images as video.

12. The system of claim 1, wherein:
the processor is further operable to estimate the visibility of the scene in real time.

13. The system of claim 1, further comprising:
one or more additional camera devices, each being operable to capture a polarization based image at substantially the same time as the first image from the first camera device and the first image from the second camera device.

14. The system of claim 1, wherein:
the visibility comprises a numerical value pertaining to a visibility of an indoor scene, a visibility underwater, or a visibility of an outdoor scene.

15. A method, comprising:
capturing an image of a scene with a first camera device at a first band of wavelengths;
capturing another image of the scene with a second camera device at a second band of wavelengths, wherein the first and second bands are different, and wherein the images of the first and second camera devices are captured at substantially a same time;
detecting an object in the scene based on the images;
estimating an obscurant in the scene based on the images; and
estimating a visibility of the scene based on the object and the estimated obscurant,
wherein the first band of wavelengths comprises visible light, the second band of wavelengths comprises long wave infrared light, and the first camera device is a polarization sensitive camera device operable to capture full Stokes polarization.

16. A non-transitory computer readable medium comprising instructions that, when executed by a processor, direct the processor to:
control a first camera device to capture an image of a scene at a first band of wavelengths;
control a second camera device to capture an image of a scene at a second band of wavelengths, wherein the first and second bands are different, and wherein the images of the first and second camera devices are captured at substantially a same time;
detect an object in the scene based on the images;
estimate an obscurant in the scene based on the images; and
estimate a visibility of the scene based on the object and the estimated obscurant in the scene,
wherein the first band of wavelengths comprises visible light, the second band of wavelengths comprises long wave infrared light, and the first camera device is a polarization sensitive camera device operable to capture full Stokes polarization.

* * * * *